US008671313B2

(12) United States Patent
Morimura et al.

(10) Patent No.: US 8,671,313 B2
(45) Date of Patent: Mar. 11, 2014

(54) MANAGEMENT APPARATUS AND MANAGEMENT METHOD

(71) Applicant: Hitachi, Ltd., Tokyo (JP)

(72) Inventors: Tomohiro Morimura, Kawasaki (JP); Masashi Kunii, Yokohama (JP); Yutaka Kudo, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/925,131

(22) Filed: Jun. 24, 2013

(65) Prior Publication Data

US 2013/0290784 A1  Oct. 31, 2013

Related U.S. Application Data

(63) Continuation of application No. 12/745,212, filed as application No. PCT/JP2010/001767 on Mar. 11, 2010, now Pat. No. 8,473,786.

(30) Foreign Application Priority Data

Feb. 23, 2010  (JP) ................................. 2010-037369

(51) Int. Cl.
*G06F 11/00* (2006.01)
(52) U.S. Cl.
USPC ................................. 714/26; 714/25; 714/48
(58) Field of Classification Search
None
See application file for complete search history.

(56) References Cited

U.S. PATENT DOCUMENTS

| 5,661,668 | A | 8/1997 | Yemini et al. | |
| 6,067,637 | A * | 5/2000 | Auer et al. | 714/26 |
| 6,249,755 | B1 | 6/2001 | Yemini et al. | |
| 6,868,367 | B2 | 3/2005 | Yemini et al. | |
| 7,600,007 | B1 | 10/2009 | Lewis | |
| 7,945,817 | B1 * | 5/2011 | Usery et al. | 714/48 |

(Continued)

FOREIGN PATENT DOCUMENTS

| JP | 05-053809 | 3/1993 |
| JP | 07-093156 | 4/1995 |
| JP | 2009-070146 | 4/2009 |

OTHER PUBLICATIONS

Forgy, Charles L., Rete: A Fast Algorithm for the Many Pattern/Many Object Pattern Match Problem; Artificial Intelligence, vol. 19 No. 1, 1982, pp. 17-37.

(Continued)

*Primary Examiner* — Michael Maskulinski
(74) *Attorney, Agent, or Firm* — Foley & Lardner LLP

(57) ABSTRACT

A management apparatus and a management method that enable parsing processing to be executed efficiently by means of a working memory of a fixed size are proposed. One or more predefined rules are divided into one or more rule segments that comprise a condition and a conclusion that each form part of the rule, and the rule segments obtained through the division are stored in the secondary storage, and when an event notification from the information processing device is received, one or more related rule segments are selected and, by linking the selected one or more rule segments in the memory as required, a rule parsing network is constructed that indicates relationships between rules in the memory, an inference is derived on the basis of the constructed rule parsing network, and rule segments that are not readily used in inference derivation are deleted from the memory.

12 Claims, 29 Drawing Sheets

(56) References Cited

U.S. PATENT DOCUMENTS

| | | | |
|---|---|---|---|
| 8,086,905 B2* | 12/2011 | Matsumoto et al. | 714/47.1 |
| 8,370,108 B2* | 2/2013 | Fujimaki et al. | 702/182 |
| 8,429,453 B2* | 4/2013 | Ito et al. | 714/25 |
| 2009/0313198 A1 | 12/2009 | Kudo et al. | |
| 2009/0327811 A1* | 12/2009 | Hofford | 714/26 |

OTHER PUBLICATIONS

Kudo, Yutaka, et al.; Rule Description and its Execution for Root Cause Analysis; Dec. 11, 2009; pp. 1-6+1 page; IEEJapan.

PCT International Search Report and Written Opinion on Application No. PCT/JP2010/001767; May 25, 2010; 10 pages.

* cited by examiner

FIG.16

| SEGMENT ID | STORAGE SITE | RULE IDENTIFICATION INFORMATION |
|---|---|---|
| X1-10a_seg | file://D:¥seg_repo01, 1af00... | X1 |
| X1-1Na_seg | file://D:¥seg_repo01, 1af01... | X1 |
| ⋮ | ⋮ | ⋮ |

| OBJECT TYPE | IDENTIFICATION INFORMATION | LINK DESTINATION SEGMENT ID | LINK DESTINATION OBJECT ID | READING STATUS |
|---|---|---|---|---|
| CONCLUSION | Y1 | X1-10a_seg | X1_ID | LOADED |
| CONCLUSION | Y1 | X2-10a_seg | X2_ID | LOADED |
| EVENT | Z5 | X4_seg | Y4-20_ID | LOADED |
| EVENT | Z5 | X5_seg | X5-20_ID | NOT |
| RULE | X1 | X1-10a_seg | X1-20a_ID | LOADED |
| RULE | X1 | X1-11a_seg | X1-21a_ID | NOT |
| ⋮ | ⋮ | ⋮ | ⋮ | ⋮ |
| 33A | 33B | 33C | 33D | 33E |

FIG.18

| SEGMENT ID | RULE IDENTIFICATION INFORMATION | LOCK STATUS | COUNTER | AVERAGE READ INTERVAL | LATEST REFERENCE TIME |
|---|---|---|---|---|---|
| X1-10_seg | X1 | locked | 0 | 15.0 | 2009:11:... |
| X1-1N_seg | X1 | valuated | 0 | 15.0 | 2009:11:... |
| ⋮ | ⋮ | ⋮ | ⋮ | ⋮ | ⋮ |
| 35A | 35B | 35C | 35D | 35E | 35F |

FIG.21

| EVENT ID | RULE IDENTIFICATION INFORMATION |
|---|---|
| Z1 | X1 |
| Z2 | X1 |
| Z3 | X2 |
| Z4 | X3 |
| Z5 | X4, X5 |
| ⋮ | ⋮ |

| EVENT ID | RULE IDENTIFICATION INFORMATION |
|----------|--------------------------------|
| Z5 | X1, X2, X3 |
| Z6 | X4 |
| Z7 | X5 |
| ⋮ | ⋮ |

| PARENT RULE | CHILD RULE |
|---|---|
| X4 | X1 |
| X4 | X2 |
| X4 | X3 |
| ⋮ | ⋮ |
| X5 | X1 |
| X5 | X2 |
| X5 | X3 |
| ⋮ | ⋮ |
| X6 |  |
| ⋮ | ⋮ |

82A   82B   82

MANAGEMENT APPARATUS AND MANAGEMENT METHOD

CROSS-REFERENCE TO RELATED PATENT APPLICATIONS

Japan Priority Application 2010-037369, filed Feb. 23, 2010 including the specification, drawings, claims and abstract, is incorporated herein by reference in its entirety. This application is a Continuation of U.S. application Ser. No. 12/745,212 (National Stage of PCT/JP2010/001767), filed May 27, 2010, incorporated herein by reference in its entirety.

TECHNICAL FIELD

Background Art

In recent years, computer systems have been afforded a greater complexity and scale by interconnecting various information processing devices via a computer network (referred to hereinbelow simply as a "network"). As a result, a fault generated in any one information processing device now affects various information processing devices via the network.

Conventionally, root cause parsing techniques for specifying the site and cause of such a fault have included the event correlation technique with which the site and cause of the fault are parsed using an event indicating fault content that is transmitted from the information processing device (see PTL1, for example). The event correlation technique infers the root cause by using an event correlation that is established on the management server at the time of the fault, and has therefore long been used in the diagnosis of a network system fault.

Moreover, non-PTL1 discloses this technique and a technique for rapidly determining the root cause using an inference engine based on an expert system by creating a rule by pairing a combination of events at the time of a fault with an inferred root cause.

In this expert system-based event correlation, when there is an increase in the scale of the IT system that is to undergo fault parsing or a large number of rules, a large working memory size is required for the rule parsing network linking the relationships between the rules used in the pattern matching of the inference engine of PTL2. One such rule parsing network is a technique called a codebook that is disclosed in PTL2 and with which the relationship between the event when the fault occurs and what is considered the root cause is expressed in a matrix format referred to as a 'matrix' and with which technique partitioning and minimization are carried out by optimizing the matrix.

CITATION LIST

Patent Literature

[PTL 1] U.S. Pat. No. 6,249,755
[PTL 2] U.S. Pat. No. 6,868,367

Non-Patent Literature

[Non-PTL1] "Rete: A Fast Algorithm for the Many Pattern/Many Object Pattern Match Problem," ARTIFICIAL INTELLIGENCE, Vol. 19, no. 1, 1982, pages 17 to 37.

SUMMARY OF INVENTION

Technical Problem

The event correlation technique is effective in filtering the fault cause candidates from an event combination pattern that is notified at the time of the fault to the management server by the device in which the fault occurred. However, when there are large numbers of events and root causes to be combined, the resulting combination pattern is enormous and the retrieval space is huge for performing pattern matching between combinations of groups of events that have actually occurred and events defined as rules. As a result, not only does it take time to derive the parsing result but, owing to the huge retrieval space, there is an increase in the size of the memory (working memory) to which the processor refers while executing this parsing.

To deal with this problem, PTL2 discloses a system in which the relationships between event combinations and root causes are placed in a matrix chart and the matrix chart is minimized through optimization, for example. However, such optimization is not a solution for the enlargement of the matrix chart due to the number of defined events and the number of rules, but rather eliminates redundant relationships between event combinations and root causes, having a different optimization target. Furthermore, the size of the working memory during parsing processing is desirably not dependent on the structure of the rule parsing network or the scale of the target system, that is, the number of events handled or the number of rules.

The present invention was devised in view of the aforementioned problems, and seeks to propose a management apparatus and a management method with which parsing processing can be executed in a short parsing time while maintaining a fixed working memory size irrespective of the number of defined events and the number of rules of the target system.

Solution to Problem

In order to achieve the foregoing object, the present invention is a management apparatus for managing one or more information processing devices, comprising a secondary storage for storing one or more predefined rules in which a combination of events generated in the information processing devices is taken as a condition and a matter prescribed for the event combination is taken as an inferential conclusion; a network interface which, when an event is generated in the information processing device, receives an event notification corresponding to the content of the event that is transmitted from the information processing device; a processor which determines the status of the information processing device on the basis of the event notification and the corresponding rule; and a memory that is used as a working memory of the processor; wherein the processor divides the one or more predefined rules into one or more rule segments that comprise a condition and a conclusion that each form part of the rule, and stores the rule segments obtained through the division in the secondary storage, and when an event notification from the information processing device is received, selects one or more related rule segments and, by linking the selected one or more rule segments in the memory as required, constructs a rule parsing network that indicates relationships between rules in the memory, derives an inference on the basis of the constructed rule parsing network, and deletes rule segments that are not readily used in inference derivation from the memory.

Furthermore, the present invention is a management method for managing one or more information processing devices, comprising a first step of storing one or more predefined rules in which a combination of events generated in the information processing devices is taken as a condition and a matter prescribed for the event combination is taken as an inferential conclusion; a second step of receiving, when an event is generated in the information processing device, an event notification corresponding to the content of the event that is transmitted from the information processing device; and a third step of determining the status of the information processing device on the basis of the event notification and the corresponding rule, wherein, in the first step, the one or more predefined rules are divided into one or more rule segments that comprise a condition and a conclusion that each form part of the rule, and the rule segments obtained through the division are stored in the secondary storage, and in the third step, when an event notification from the information processing device is received, one or more related rule segments are selected and, by linking the selected one or more rule segments in the memory as required, a rule parsing network is constructed that indicates relationships between rules in the memory, an inference is derived on the basis of the constructed rule parsing network, and rule segments that are not readily used in inference derivation are deleted from the memory.

Advantageous Effects of Invention

According to the present invention, even in cases where there is an increase in scale of the devices and components of the information processing system undergoing fault parsing or an increase in the number of rules handled, the execution of parsing processing, based on pattern matching of a combination of a received event and an event that is indicated in a predefined rule condition, can be implemented efficiently by using a fixed-size working memory.

BRIEF DESCRIPTION OF DRAWINGS

FIG. 16 is a conceptual view of a configuration example of segment reference information.
FIG. 17 is a conceptual view of a configuration example of segment link information.
FIG. 18 is a conceptual view of a configuration example of segment reference history information.
FIG. 21 is a conceptual view of a configuration example of a first related information table.
FIG. 22 is a conceptual view of a configuration example of a second related information table.
FIG. 25 is a conceptual view of a configuration example of a rule information-dependency management table.
FIG. 27 is a flowchart showing a processing procedure for processing to create rule segments or the like.

REFERENCE SIGNS LIST

Figure 1:
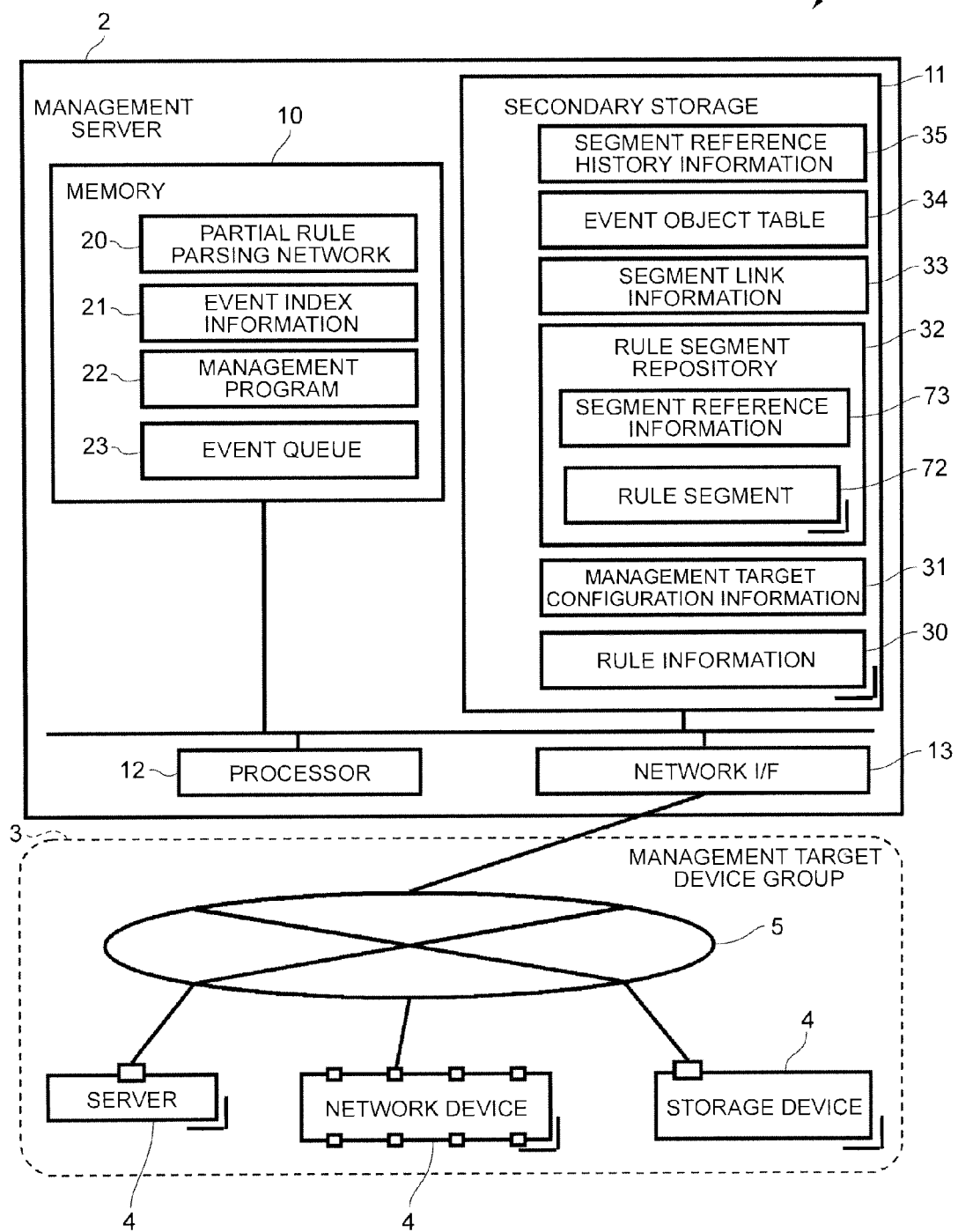
FIG. 1 is a block diagram schematically showing the overall configuration of an information processing system according to this embodiment.

1 Information processing device
2 Management server
3 Management target device group
4 Management target device
10 Memory
11 Secondary storage
12 Processor
20 Partial rule parsing network
21 Event index information
22 Management program
23 Event queue
30 Rule information
31 Management target configuration information
32 Rule segment repository
33 Segment link information
34 Event object table
35 Segment reference history information
50 Event information
72 Rule segment
73 Segment reference information

DESCRIPTION OF PREFERRED EMBODIMENTS

An embodiment of the present invention will be described in detail hereinbelow with reference to the drawings.
Note that in the following description, devices having a built-in communication function for performing network communications such as a server apparatus, a storage subsystem, a printer, a scanner, a personal computer, a PDA, and/or a cell phone, and the like, and devices having a built-in function for relaying network communications such as a router, proxy server, and/or a switch and the like, for example, will be referred to comprehensively as 'information processing devices.' Furthermore, as the server apparatus, a Web server, a file server, a name server, a directory server, or an authentication server or the like, for example, may be considered but the server apparatus according to the present specification may encompass any apparatus providing any kind of service.

In the following description, various information will be described using expressions such as 'AAA Table,' 'AAA list,' 'AAA database' or 'AAA queue' and so on. However, this information may be expressed by a data structure other than a table, a list, a database, or a queue. Hence, in order to reflect this lack of dependence on data structure, 'AAA table,' 'AAA list,' 'AAA database' and 'AAA queue' and so on will sometimes be referred to as 'AAA information.'

Furthermore, expressions such as 'identification information,' identifier, 'title,' 'name,' 'ID,' and 'number' are used when explaining the content of each information item. However, these expressions are not limited to describing physical entities such as devices or parts, rather they may also be assigned to differentiating between logical entities, and can therefore be substituted.

In the following, processing subjects pertaining to various processes are described as 'programs' but it goes without saying that in actual fact the processes are executed by a processor based on such programs. In addition, the processing, which is disclosed taking the programs as the subject, may also be processing executed by a computer such as a management server or an information processing device. Moreover, some or all of the programs may also be realized by dedicated hardware. In addition, various programs may be installed on each computer by a program distribution server or using storage media.

(1) Configuration of an Information Processing System According to this Embodiment In FIG. 1, 1 denotes the overall information processing system according to this embodiment. The sign ⌐ in the figure indicates that there are a plurality of the corresponding parts. The information processing system 1 is configured comprising a management server 2, and a management target device group 3 comprising one or more information processing devices 4.

The management server 2 is a server apparatus for managing and monitoring each of the information processing devices 4 that form the management target device group 3, and comprises a memory 10 that provides a storage area for storing electronic data such as a program and control information, and secondary storage 11 for supplementing any lack of storage capacity of the memory 10, a processor 12 that executes processing to parse a fault that arises in the management target device group 3 by using electronic data in the memory 10, and a network interface 13 for sending and receiving electronic data via the management target device group 3 and the management network 5 (the interface may sometimes be abbreviated to I/F hereinbelow).

The memory 10 is configured from semiconductor memory or magnetic memory that uses magnetism to store data, for example, for instance, and is used to hold various programs and various control information. A partial rule parsing network 20, event index information 21, a management program 22, and an event queue 23, all of which are described subsequently, are also stored and held in the memory 10.

The secondary storage 11 is configured from a magnetic disk device or an external storage subsystem, or from both a magnetic disk device and an external storage subsystem, for example, and is used to permanently hold various programs and various control information. Rule information 30, management target configuration information 31, a rule segment repository 32, segment link information 33, an event object table 34, and segment reference history information 35 are also stored and held in this secondary storage 11.

The processor 12 has a function for controlling the operations of the whole management server 2 and executes various computation processes and control processing on the basis of electronic data stored in the memory 10 and secondary storage 11 or the like. Furthermore, the network interface 13 is an interface to the management network 5 and is configured from an NIC (Network Interface Card) and a LAN (Local Area Network) board and so forth.

Note that the management server 2 also comprises I/O devices, which are not shown. Examples of I/O devices that may be considered are a display, a keyboard and a pointing device, but other devices are also possible. In addition, as a substitute for I/O devices, the input and output may be provided by a serial interface and Ethernet (registered trademark) interface, and the input and display of the I/O device may be replaced by coupling a display computer having a display, and a keyboard or pointing device to the interface so that display information is sent to the display computer and input information is received from the display computer, whereby a display is executed by the display computer and inputs are accepted.

Figure 2:
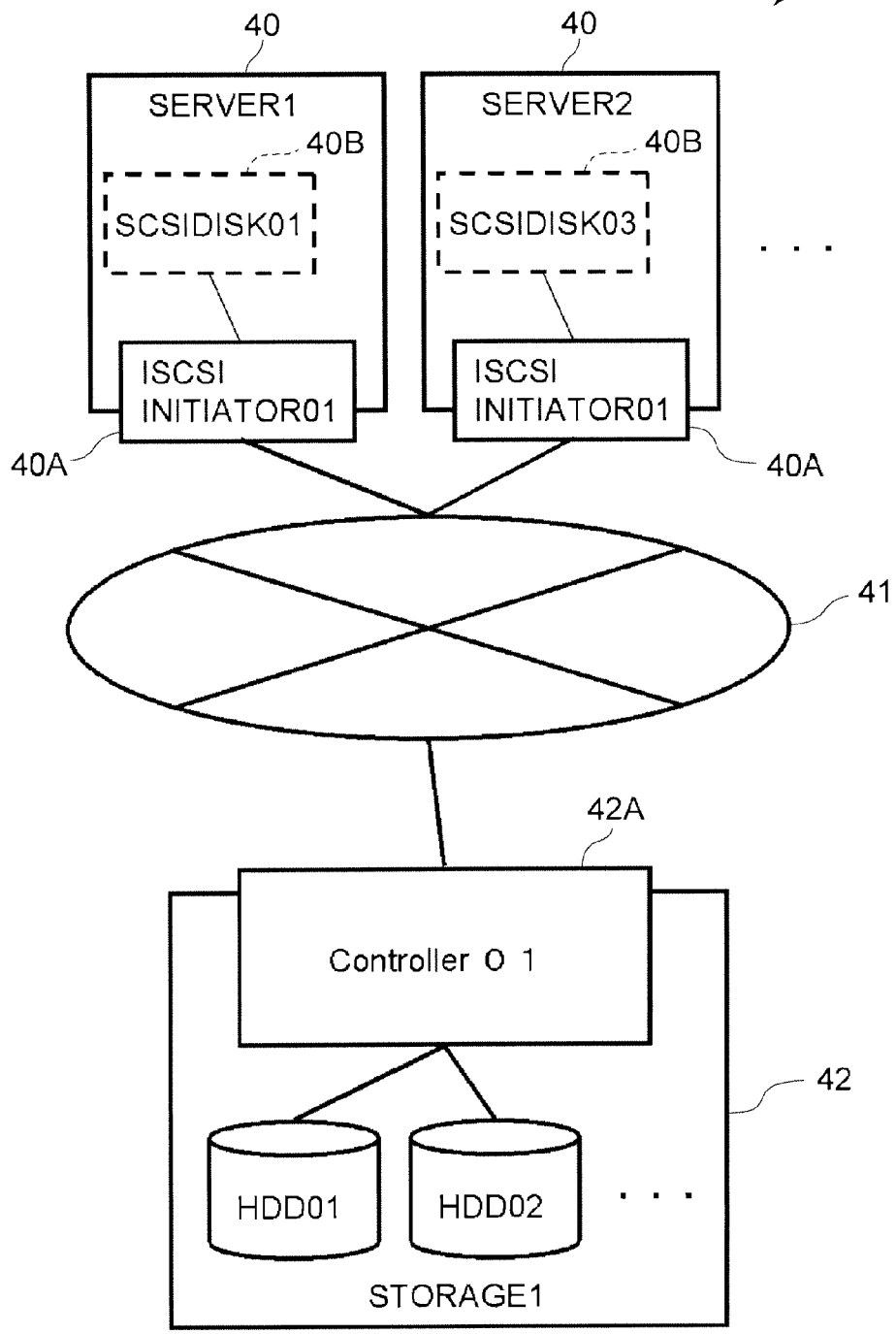
FIG. 2 is a block diagram showing a configuration example of a management target device group.

The management target device group 3 is configured from one or more information processing devices 4 as mentioned earlier. FIG. 2 shows a configuration example of the management target device group 3. In this example, the management target device group 3 is configured from a plurality of servers 40 ('SERVER1,' 'SERVER,' . . . ), a network 41, and one storage device 42 ('STORAGE1'). Furthermore, FIG. 2 illustrates a case where volumes of the storage device 42 are provided as SCSI disks 40B ('SCSIDISK01,' 'SCSIDISK03') by way of the ISCSI (Internet Small Computer System Interface) protocol via HBA (Host Bus Adapter) 40A known as the 'ISCSI INITIATOR01' of the server 40. Note that, in FIG. 2, the 'Controller01' of the storage device 42 is a processor for controlling the storage device 42 and comprises an ISCSI port.

The management network 5 is configured from a LAN (Local Area Network), an Ethernet, or a dedicated line or the like. The management network 5 may be a different network from a network for communicating with the information processing devices 4 or a network that is partially the same or completely identical.

A set of one or more computers that manage the management target device group 3 and which display the display information according to the present embodiment will sometimes to be referred to hereinbelow as a management system. In a case where the management server 2 displays display information, the management server 2 is a management system, and a combination of the management server 2 and the display computer is also a management system. In order to achieve faster and more reliable management processing, a plurality of computers may also realize the same processing as the management server 2, in which case the plurality of computers (also including a display computer if a display computer executes the display) is the management system.

(2) Fault Cause Parsing Function According to this Embodiment

A fault cause parsing function installed on the management server 2 will be described next. In so doing, an event notification, the rule information and the rule parsing network will be described first.

(2-1) Event Notification, Rule Information, and Rule Parsing Network

Figure 3:
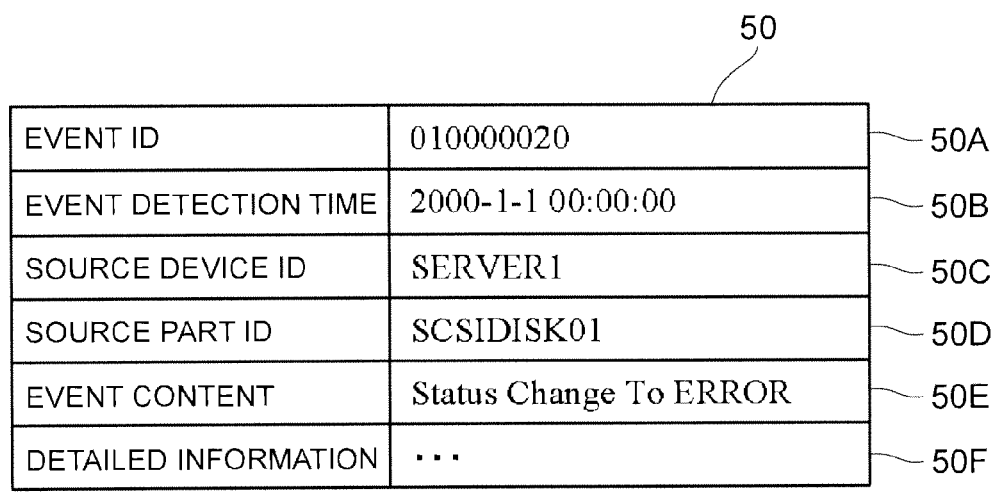
FIG. 3 is a conceptual view of a configuration example of an event notification.

FIG. 3 shows a schematic configuration of an event notification 50 that is sent to the management server 2 from the information processing device (also called a management target device hereinbelow) 4 which undergoes management and monitoring by the management server 2 when a fault occurs in the management target device 4. As is also clear from FIG. 3, the event notification 50 is configured comprising an event ID 50A, an event detection time 50B, a source device ID 50C, a source part ID 50D, event content 50E, and detailed information 50F.

Among the foregoing, the event ID 50A denotes the ID that is pre-assigned to the event that is generated at that time, and the event detection time 50B indicates the time the event was generated. Furthermore, the source device ID 50C is an identifier that is pre-assigned to the information processing device 4 in which the event was generated, and the source part ID 50D represents an identifier that is pre-assigned to a part of the information processing device 4 in which the event was generated. The event content 50E denotes the content of the event. The detailed information 50F denotes detailed event-related information. The detailed information 50F includes information (a message, for example) other than the event-related information above.

Hence, in the example of FIG. 3, it is shown that in the environment of FIG. 2, ('Status Change To ERROR'), which indicates that the status of a part known as 'SCSIDISK01' of the server 40 called 'SERVER1' has changed to error, is detected by the server 40 or a management apparatus thereof (not shown) at '00:00:00 2000-1-1,' and that the event ID of this event is '010000020.'

Figure 4:
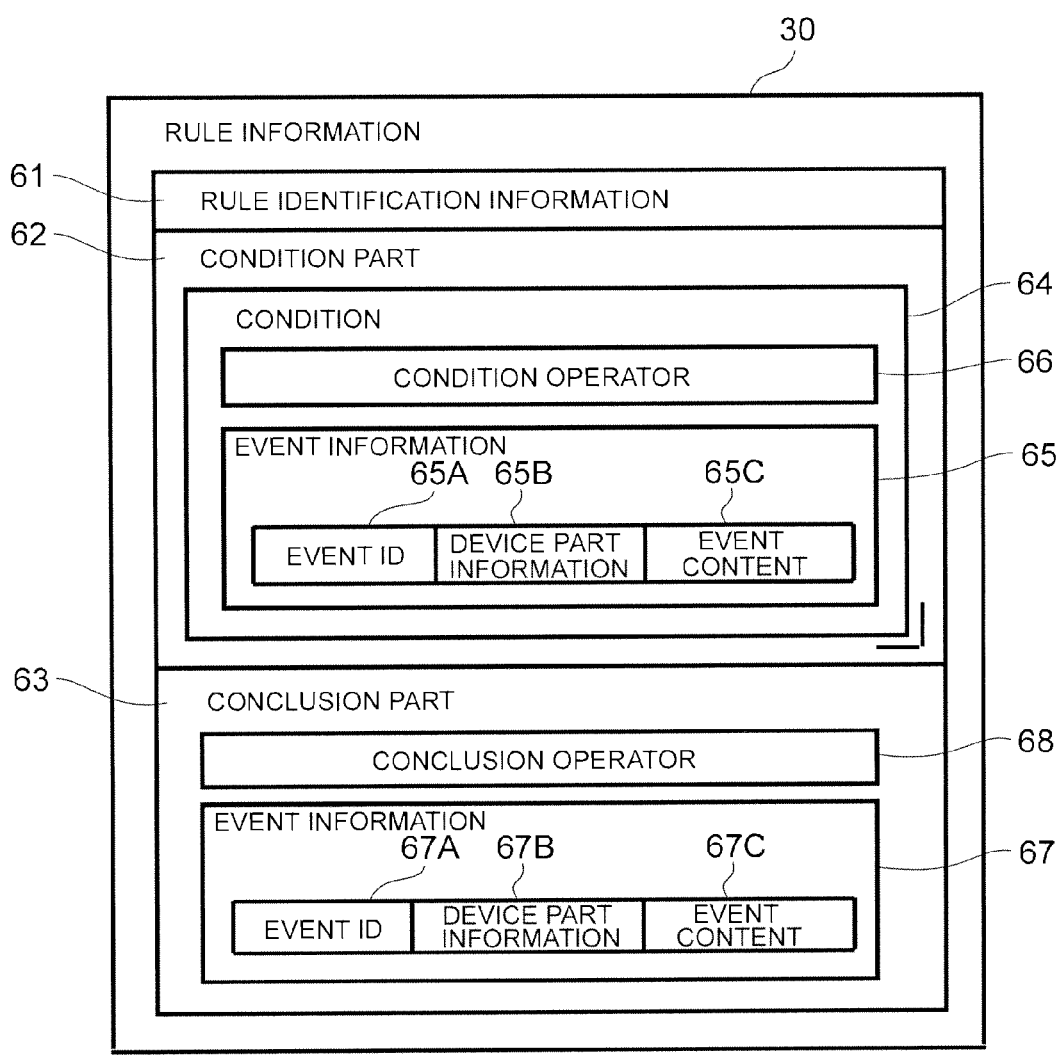
FIG. 4 is a conceptual view of a configuration example of rule information.

However, FIG. 4 shows the configuration of rule information 30. The rule information 30 is information relating to a rule whereby an event combination is taken as the condition and the root cause of the event combination is taken as the inferential conclusion, and a plurality of information items are created by the system administrator and so on beforehand and registered on the management server 2. As will be described subsequently, the management server 2 infers the root cause of a fault on the basis of an event notification 50 (FIG. 3) that is transmitted from the management target device 4 in which the fault occurred or the management apparatus thereof and so on, and the rule information 30.

The rule information 30 is configured from the rule identification information 61, the condition part 62, and the conclusion part 63 as shown in FIG. 4, for example. Of these, the rule identification information 61 is an identifier for uniquely identifying rules and different values are assigned to each item of rule information 30.

The condition part 62 is configured from one or more conditions 64. Furthermore, each condition 64 is configured from event information 65 and a condition operator 66. The event information 65 of the condition 64 is event-related information and includes an event ID 65A of the corresponding event, device part information 65B representing the part in which the event occurred, and event content 65C.

The event ID 65A and the event content 65C used are the same as those used in the event notification 50 (FIG. 3), and the device part information 65B used is obtained by combining the source device ID 50C and the source part ID 50D that are used in the event notification 50.

In addition, the condition operator 66 is an operator that designates computation of corresponding event information 65 and includes an operator such as 'NOT' in a case where a condition is 'do not receive.' The condition operator 66 indicates that a condition is omissible and if omitted, the condition taken is 'receive' the event information 65.

The conclusion part 63 is configured from event information 67 representing the conclusion of an 'if-then' format rule and a conclusion operator 68 that designates the way in which the evaluation of the condition part 62 is to be calculated. Since a common conclusion can also be derived by a plurality of rules, a common conclusion part 63 is sometimes used by a plurality of rule information 30. The conclusion operator 68 is an operator that designates, in the case a conclusion part 63 is shared by a plurality of rules, how the match percentage of these rules is to be reflected as the match percentage to the common conclusion part 63. For example, there is a method of calculation whereby evaluation is performed in the form of the match percentage of all the rule conditions by taking the maximum match percentage among the plurality of rules as the conclusion match percentage, and then uniformly weighting the match percentages of the plurality of rules. Note that the type of the conclusion operator 68 does not limit the present embodiment.

The event information 67 of the conclusion part 63 comprises an event ID 67A, device part information 67B, and event content 67C. This event ID 67A, device part information 67B, and event content 67C are the same as the event ID 65A, device part information 65B, and event content 65C of the event information 65 of the condition part 62, and therefore a description of the details is omitted here.

Figure 5:
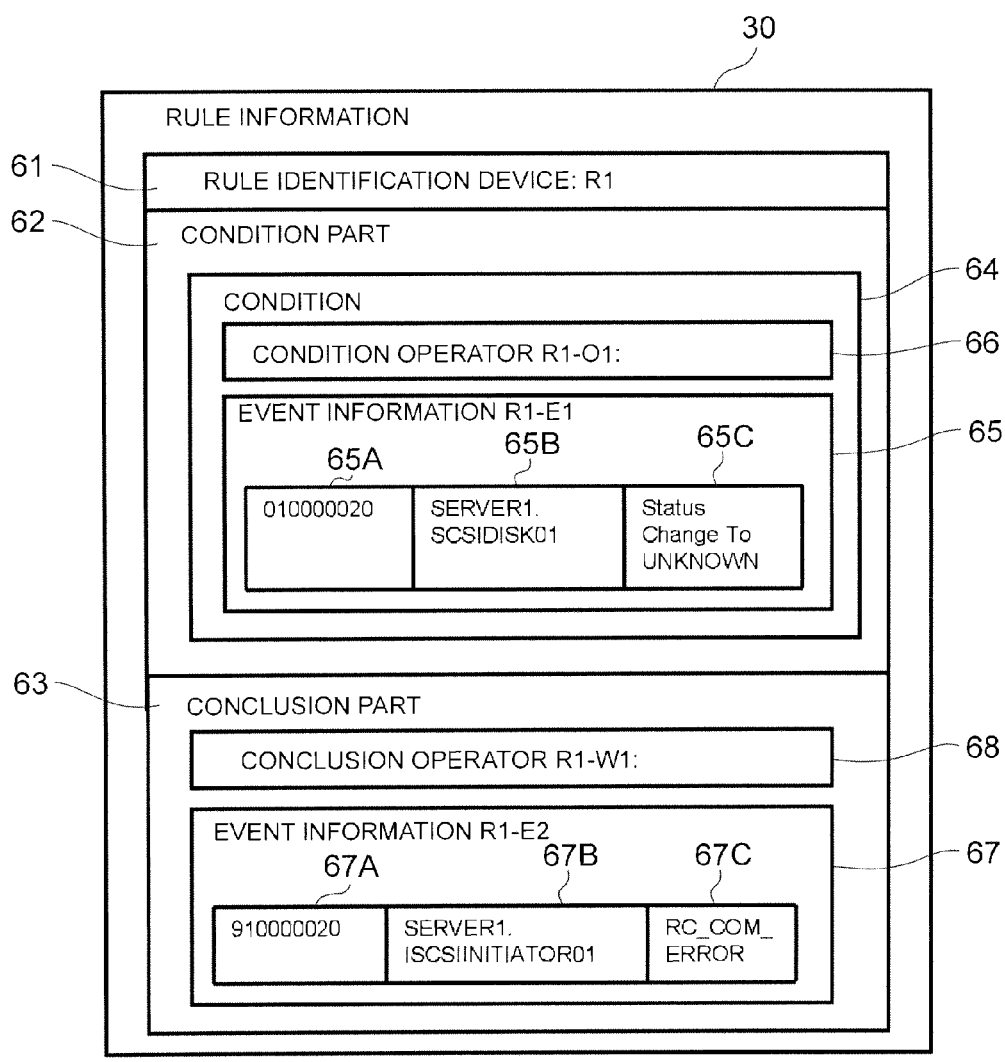
FIG. 5 is a conceptual view a specific configuration example of rule information.

A specific example of the rule information 30 is shown in FIG. 5. FIG. 5 is a specific example of a rule for inferring that if, in the environment of FIG. 2, the status of a volume 'SCSIDISK01' that is supplied by the storage device 42 called 'STORAGE1' to the server 40 known as 'SERVER1' has changed to error, the root cause of this change in status is an ISCSI communication error in the 'SERVER1.' In other words, in the rule information 30 of FIG. 5, the following items are designated.

(a) In the condition part 62, a rule is provided for a case where an event notification 50 is received notifying that an event, i.e. an event with the event ID '010000020' and called '('Status Change To UNKNOWN'): status change to error,' has occurred in 'SCSIDISK01' of 'SERVER1' (refer to event information 65 of condition 64). Note that in addition to this error status being a status in which at least a device or a part is not used, a status generally taken to be erroneous may also be included. Unless another case explained hereinafter is described in particular, error status will have the meaning mentioned above.

(b) In the conclusion part 63, there is a provision that, if this event notification 50 is received, the cause will be inferred as being an event with an event ID '910000020' and which is known as an 'ISCSI communication error ('RC_COM_ERROR')' in HBA 40A called the 'ISCSIINITIATOR01' of the server 40 known as 'SERVER1' (see event information 67 of the conclusion part 63).

Figure 6:
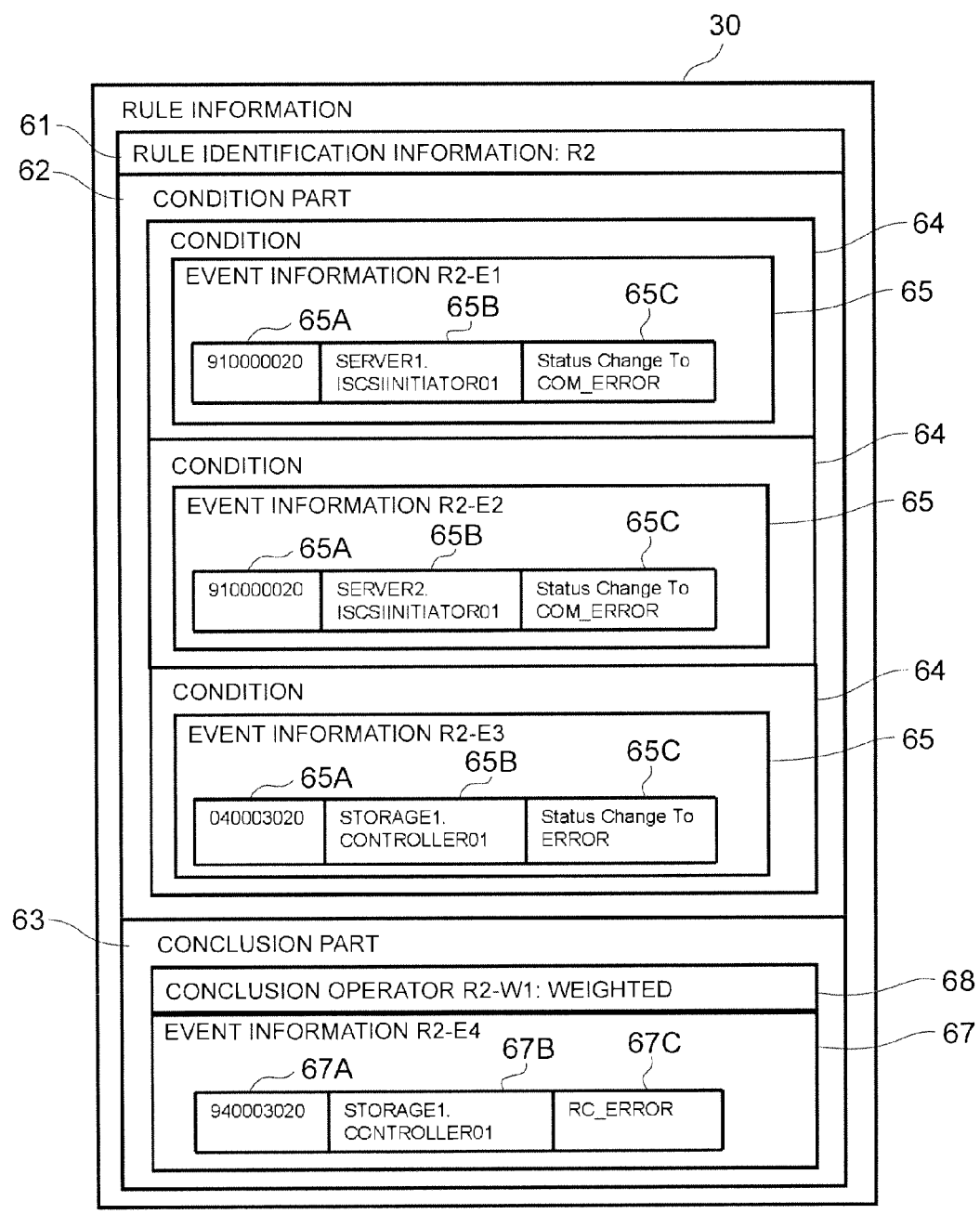
FIG. 6 is a conceptual view a specific configuration example of rule information.

Another specific example of the rule information 30 is shown in FIG. 6. FIG. 6 is a specific example of a rule according to which, in the environment of FIG. 2, if an ISCSI communication error is generated in the HBA 40A known as the 'ISCSIINITIATOR01' of the server 40 called 'SERVER1,' an ISCSI communication error is generated in the HBA 40A known as the 'ISCSIINITIATOR01' of the server 40 called 'SERVER2,' and the status of the controller 42A called 'CONTROLLER01' of the storage device 42 known as 'STORAGE1' has changed to error, it is inferred that the root cause of this change in status is a fault in the 'CONTROLLER01' of 'STORAGE1.' In other words, the following items are designated by the rule information 30 of FIG. 6.

(a) In the condition part 62, a rule is provided for a case of receiving an event notification 50 that an event with an event ID '910000020' known as an 'ISCSI communication error (Status Change To COM_ERROR)' in the 'ISCSIINITIATOR01' of 'SERVER1,' an event notification 50 that an event with an event ID '910000020' known as an 'ISCSI communication error (Status Change To COM_ERROR)' in the 'ISCSIINITIATOR01' of 'SERVER2,' and an event communication 50 that an event with an event ID '040000020' known as an 'error (Status Change To ERROR)' in the 'CONTROLLER01' of 'STORAGE1' (see event information 65 of each condition 64 of the condition part 62).

Note that the event ID of the event information 65 is the same as the event information 67 of the conclusion part 63 of the rule information 30 of FIG. 5, and the event information 67 defined in the conclusion part 63 of the other rule information 30 differs from the event notification 50 transmitted from the management target device group 3 and is created and used only within the management server 2. The event information 67 that is designated by the conclusion part 63 of FIG. 5 is called internal event information that is distinguished from the event notification 50 transmitted from the management target device group 3.

(b) In the conclusion part 63, there is a provision to infer, if the event notifications 50 above are received, that the cause is an event having an event ID '940003020' and known as an 'error (RC_ERROR)' of the 'CONTROLLER01' of 'STORAGE1' (see the event information 67 of the conclusion part 63).

Figure 7:
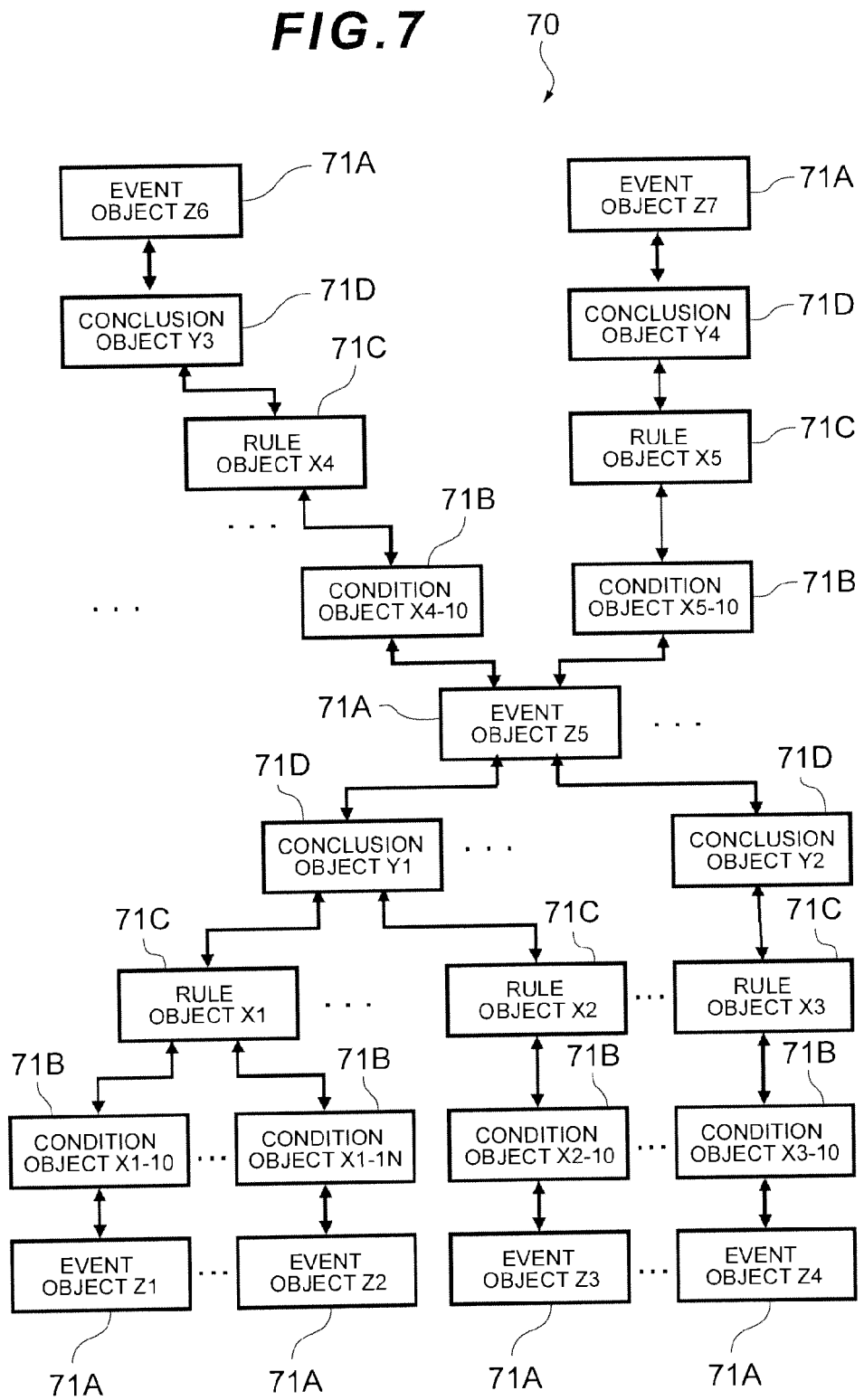
FIG. 7 is a conceptual view a partial configuration example of a rule parsing network.

Meanwhile, FIG. 7 shows a configuration example of the rule parsing network 70. In the following description, in a management system in which the management program 22 of the management server 2 performs inference based on an event notification 50 that is transmitted to the management server 2 from any of the management target devices 4 included in the management target device group 3 and in which management system current phenomena are inferred, a rule linking network that links relationships between a plurality of rule information 30 to which the management program 22 refers during inference processing (a relationship where rules A and B are linked via a conclusion if the conclusions of rules A and B are identical) will be called the rule parsing network 70.

FIG. 7 schematically shows the rule parsing network 70 that is constructed by linking together related event information 65 and 67 on the basis of all the rule information 30 stored in the secondary storage 11, as will be described subsequently. The two-way arrows in the figure have a mutual reference relationship, indicating that the coupled objects 71 (71A to 71D) can be followed from either direction. As the objects 71 forming this rule parsing network 70, an event object 71A, a condition object 71B, a rule object 71C, and a conclusion object 71D exist.

Figure 8:
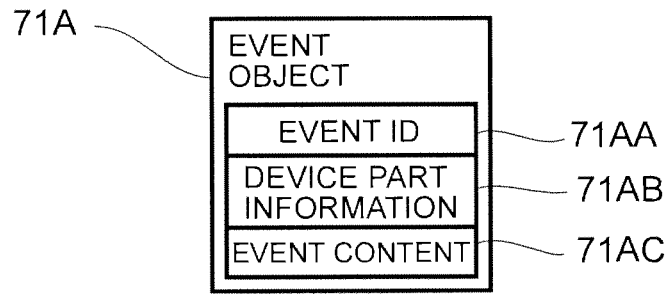
FIG. 8 is a conceptual view a configuration example of an event object.

The event object 71A is an object generated on the basis of event information 65 (FIG. 4) included in condition 64 of the condition part 62 of the rule information 30 and event information 67 included in the conclusion part 63 and, as shown in FIG. 8, includes each of an event ID 71AA, device part information 71AB, and event content 71AC. Of these, the event 71AA is obtained by copying the event IDs 65A and 67A of the corresponding event information 65 and 67. Furthermore, the device part information 71AB is information obtained by combining codes respectively representing devices and parts in which events originate and which are identified by the device part information 65B and 67B of the event information 65 and 67 respectively. In addition, the event content 71AC is obtained by copying the event content 65C and 67C of the event information 65, 67, but may also include other information.

Figure 9:
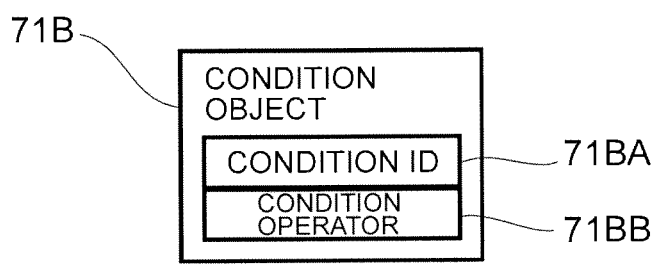
FIG. 9 is a conceptual view a configuration example of a condition object.

Furthermore, the condition object 71B is an object that is generated on the basis of each of the conditions 64 (FIG. 4) that form the condition part 62 of the rule information 30 and, as shown in FIG. 9, includes a condition ID 71BA and a condition operator 71BB. Of these, the condition ID 71BA is identification information for identifying the corresponding condition 64. Furthermore, the condition operator 71BB is obtained by copying the condition operator 66 (FIG. 4) included in the corresponding condition 64.

Figure 10:
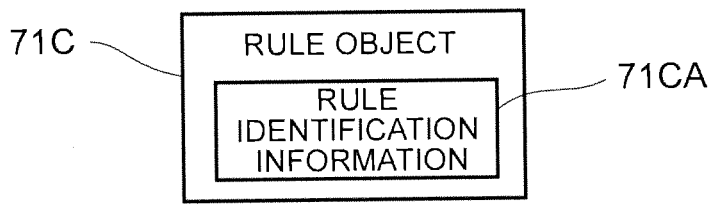
FIG. 10 is a conceptual view a configuration example of a rule object.

The rule object 71C is an object corresponding to the rule information 30 and, as shown in FIG. 7, exists as an object that links the relationship between the condition object 71B and link object 71D. The rule object 71C includes rule identification information 71CA as shown in FIG. 10. The rule identification information 71CA is obtained by copying the rule identification information 61 (FIG. 4) of the corresponding rule information 30.

Figure 11:
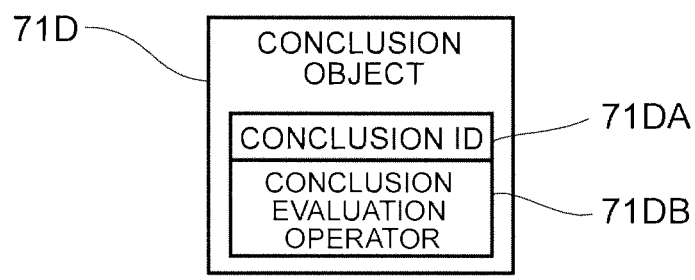
FIG. 11 is a conceptual view of a configuration example of a conclusion object.

Furthermore, the conclusion object 71D is an object that is generated on the basis of the conclusion part 63 (FIG. 4) of the rule information 30 and, as shown in FIG. 11, includes a conclusion ID 71DA and a conclusion evaluation operator 71DB. Of these, the conclusion ID 71DA is identification information for identifying the corresponding conclusion part 63. The conclusion evaluation operator 71DB is an operator for designating the method to evaluate the match percentage of a plurality of rules with a common conclusion.

The parsing process for inference derivation based on the rule information 30 is normally executed by constructing the rule parsing network 70 shown in FIG. 7 on the basis of all the rule information 30 in order to accelerate pattern matching to rules during parsing, following the related rule objects 71C by retrieving event objects 71A corresponding to events identified on the basis of the received event notifications 50, and evaluating the match percentage of the relevant conclusion object 71D in each case.

However, when the rule parsing network 70 based on all the rule information 30 is installed in the memory and referenced as working memory, this constrains the memory size and consumes a large amount of the resources of the computer executing this processing, thereby causing instability in the device. Therefore, according to this embodiment, the partial rule parsing network described hereinbelow, obtained by dividing the rule parsing network 70 into several parts, is constructed, and the parsing processing is executed by installing only the required partial rule parsing network in the memory 10.

Figure 12:
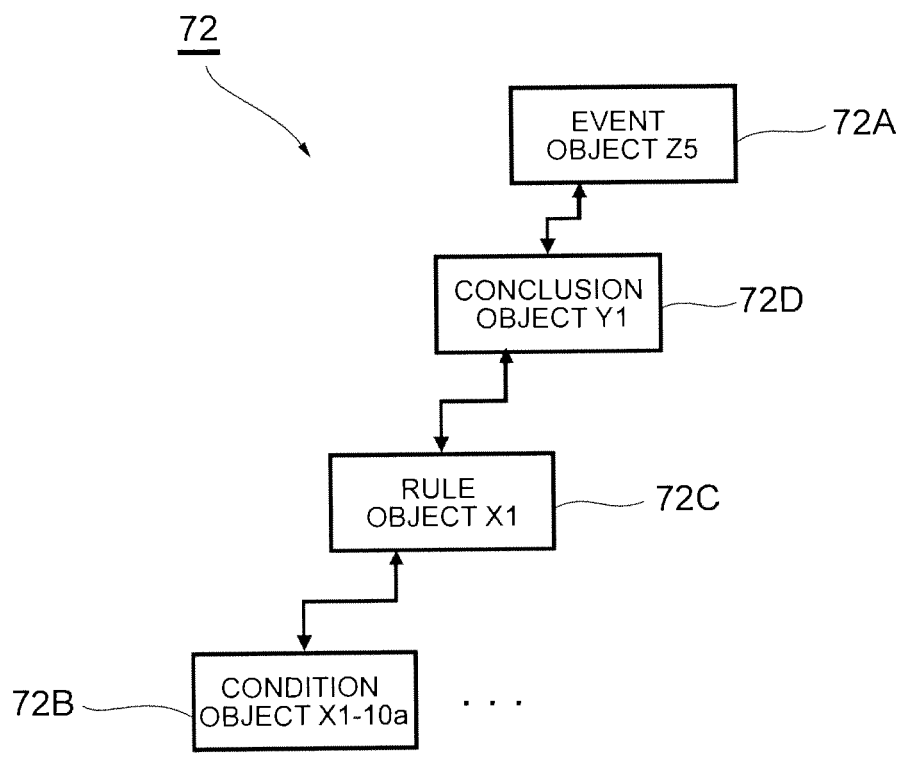
FIG. 12 is a conceptual view of a configuration example of a rule segment.

FIG. 12 schematically shows an object configuration of a segment (called a 'rule segment' hereinbelow) 72 that is obtained by dividing the rule parsing network 70 into units that correspond to one rule information item 30. The rule segment 72 has one rule object 72C, which has a two-way association with the condition object 72B corresponding to one or more conditions 64 of the condition part 62 in accordance with the rule information 30 corresponding to the rule object 72C, and the condition object 72B has a two-way association with the event object 72A which the condition objects 72B each retain.

In addition, the rule segment 72 has a two-way association with the conclusion object 72D corresponding to the conclusion part 63 of the rule information 30, and the conclusion object 72D has a two-way association with the event object 72A that represents the content of the conclusion. Thus, in the configuration of the rule segment 72, in order to retain at least one or more conditions of an optional number (that is, not exceeding the number of conditions of the rule object 72) as a condition object 72B, the condition 64 of the condition part 62 for one item of rule information 30 may be divided into a plurality of rule segments 72 and condition 64 of the condition part 62 which is in the rule information 30 may also be included in a single rule segment 72. The event object 72A, conclusion object 72D and rule object 72C that form part of the rule segment 72 are the same as the event object 71A, conclusion object 71D, and rule object 71C that form the rule parsing network 70.

Figure 13:
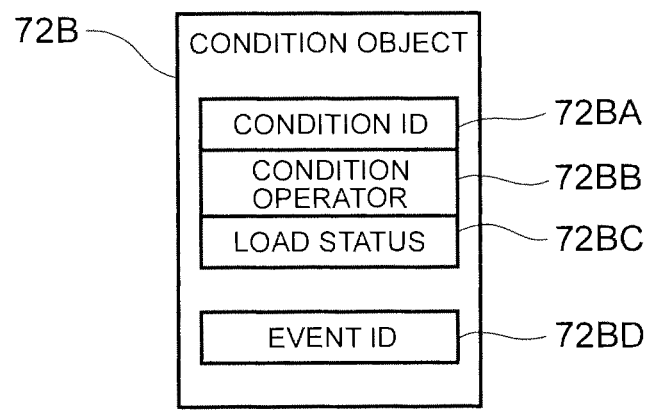
FIG. 13 is a conceptual view of a configuration example of a condition object according to this embodiment.

FIG. 13 shows the configuration of the condition object 72B according to this embodiment. This condition object 71B is an object that is used in this embodiment instead of the condition object 71B earlier in FIG. 9, and is configured comprising information which is a condition ID 72BA, a condition operator 72BB, a load status 72BC, and an event ID 72BD.

Among these object components, the condition ID 72BA and the condition operator 72BB are the same as the condition ID 71BA and condition operator 71BB of the condition object 71B earlier in FIG. 9. In addition, the load status 72BC is information indicating whether or not the condition object 72B has been read to memory. The event ID 72BD denotes the event ID of the coupled event object 72A. This event ID 72BD is used when creating a mutual reference association between the event object 72A and the condition object 72B.

(2-2) The Fault Cause Parsing Function of this Embodiment

The fault cause parsing function of this embodiment installed on the management server 2 will be described next. In the case of this embodiment, the management server 2 has a built-in fault cause parsing function for performing pattern matching, on the basis of one or more pre-provided items of rule information 30, of combinations of the conditions described in the rule information 30 and the events generated in the management target device group 3. Furthermore, one feature of the fault cause parsing function according to this embodiment is that of performing fault cause parsing processing by the means described hereinbelow as means for suppressing the size of the working memory that is used during parsing processing to a size no more than a fixed size.

(a) Before operating and managing the information processing system 1, all the registered rule information 30 is read and, after checking rule inter-dependency, rule segments 72 are created according to the dependency-based order of the rule information 30. Furthermore, information representing the relationships between rules (rule segments 72) is created as segment link information and event index information is created as index information for received event notifications 50 (FIG. 3).

(b) If a fault is generated while the information processing system 1 is being operated and managed, a required rule segment 72 and another rule segment 72 that is related to this rule segment 72, which are derived from the event index information generated in (a), are read to memory 10 (FIG. 1) based on the event notification 50 transmitted from the management target device 4 or the like in which the fault was generated, and a partial rule parsing network, which is a parsing network for the received event, is constructed by linking the rule segments 72 using the segment link information generated in (a) from these rule segments 72. Furthermore, the partial rule parsing network thus constructed is used to execute parsing processing using pattern matching to a combination of an event that is identified by the received event notification 50 and an event indicated in the rule condition. Reference history information related to referenced rule segments 72 is created at this time.

(c) If the memory size occupied by the partial rule parsing network constructed in (b) above becomes greater than a certain fixed size, a rule segment 72 with a low referencing frequency is selected using the referencing history information of the rule segment 72 created in (b), and storage area in the memory 10 is released by cleaning this rule segment 72 from the memory 10 to keep the size of the working memory at or below a fixed size.

As means for implementing the fault cause parsing function of this embodiment as described hereinabove, as shown in FIG. 1 the partial rule parsing network 20, the event index information 21, the management program 22, and the event queue 23 are stored and held in the memory 10 of the management server 20, and the rule information 30, the management target configuration information 31, the rule segment repository 32, the segment link information 33, the event object table 34, and the segment reference history information 35 are also stored and held in the secondary storage 11.

Among these information items, the partial rule parsing network 20 is a rule parsing network that holds rule relationship information that is referred to when the management program 22 performs fault parsing processing. The partial rule parsing network 20 is constructed by combining fault-related rule segments 72 (FIG. 12) on the basis of an event notification 50 (FIG. 3) that is supplied from the management target device 4 when a fault is generated.

Figure 14:
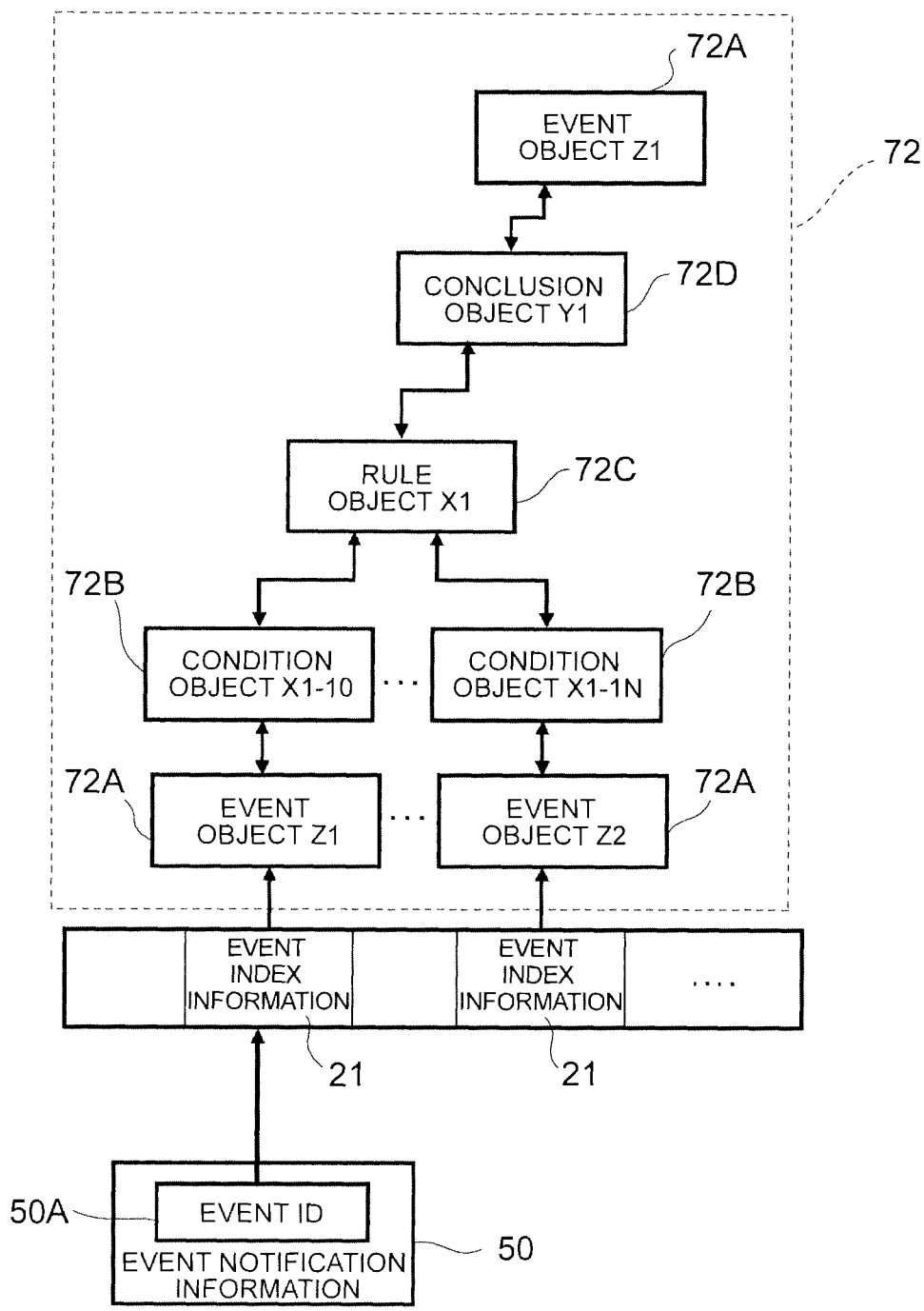
FIG. 14 is a conceptual view serving to explain event index information.

In addition, the event index information 21 is, as shown in FIG. 14, information for retrieving, when an event notification 50 is received from the management target device 4, a rule segment 72 (information indicating the relationship between an event and a rule segment 72 related to the event) that is to be used upon executing parsing processing and this event index information 21 is generated at the same time as when the management program 22 inputs the rule information 30 to create rule segments 72. Note that the memory 10 is able to store a plurality of different event index information 21.

Figure 15:
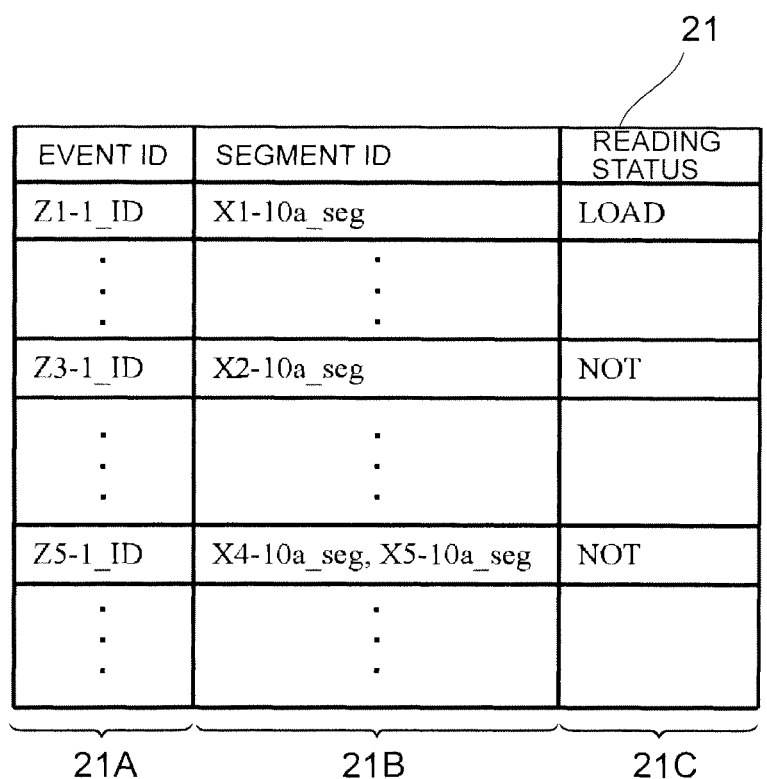
FIG. 15 is a conceptual view of a configuration example of event index information.

The event index information 21 includes, as shown in FIG. 15, information which is an event ID 21A, a segment ID 21B and a reading status 21C. Of these, the event ID 21A represents an identifier that is provided for every type of event and is the same as that applied to the event ID used in the event notification 50. Furthermore, the segment ID 21B represents an identifier (segment ID) of the rule segment 72 that should be used in parsing processing when the event notification 50 including the corresponding event ID is received.

Furthermore, the reading status 21C indicates whether the rule segment 72 that has been assigned the event ID 21A has been read to the memory 10. If, for example, the object has been read to the memory 10, the reading status is set to "LOADED" and if the object has not been read to memory, the reading status is set to "NOT."

Hence, in the example of FIG. 14, it can be seen that there is a provision that parsing processing should be executed using the rule segment 72 with a segment ID 'X1-10a_seg' if an event notification 50 is received that communicates the fact that an event with an event ID 'Z1-1_ID,' for example, has occurred, and that the rule segment 72 has already been read to the memory 10.

The management program 22 is a program for parsing a phenomenon whereby, based on receiving an event notification 50 from any management target device 4 and detecting an event by collecting information from the management target device 4, the detected event is generated in the management target device 4 as an input.

The management program 22 manages, in addition to various processing that will be explained subsequently, the statuses of each management target device 4 (for example, the existence of fault generation, the presence or absence of a setting change carried out in the management target device 4, and a status related to the performance of the management target device 4).

Specifically, the management program 22 receives management information from the management target devices 4 via the network interface 13, such as information on the existence of fault generation, and setting information and performance information for the management target devices 4. The management program 22 then determines the status of each management target device 4 on the basis of the received management information, and displays the determination result or the status of each of the management target devices 4 on a display device or the like or notifies a preset user of the determination result or status via electronic mail. Note that the management program 22 may also receive a request, received by the management server 2, to set the management target devices 4 and may set the corresponding management target devices 4 based on this request.

The event queue 23 is a queue for sequentially storing event notifications 50 that are supplied by the management target devices 4 or the management apparatus thereof. The management program 22 processes, according to a sequence stored in the event queue 23, processes that correspond to the event notifications 50 stored in the event queue 23.

Meanwhile, as described in FIGS. 4 to 6, the rule information 30 is rule-related information for performing root cause parsing of generated faults that involves inferring what kind of fault has been generated when a particular kind of event has occurred in the management target device 4. The secondary storage 11 pre-stores a plurality of such rule information 30.

The management target configuration information 31 includes identification information and authentication information such as an identifier for each management target device 4 contained in the management target device group 3 or the IP addresses used to access the management target devices 4 on the management network 5, information on the coupling statuses and logical relationships of the management target devices 4 in the management network 5 (for instance coupling relationships, server-client relationships, and containment relationships) and information relating to the configuration of the management target devices 4.

More specifically, the management target configuration information 31 includes the following information:

(a) An identifier for each of the management target devices 4. These identifiers are identifiers for communicating with the management target devices 4; for instance, IP addresses, FQDN (Fully Qualified Domain Name) or host names or the like may be considered.

(b) Types of management target devices 4 (storage subsystems, switch devices, and server apparatuses and the like, for example), and types of parts forming the management target devices 4.

(c) Information on the parts forming the management target devices 4 and containment relationships between devices and parts or between one part and another part.

(d) Parts that are coupled to parts for performing network communications.

(e) Settings of the management target devices 4.

Note that although generating or updating the management target configuration information 3 through the processing described hereinbelow may be considered, this information may also be generated by other processing.

(a) the management program 22 generates or updates the management target configuration information 31 on the basis of configuration information and setting information for the management target devices 4, which is received from the management target devices 4.

(b) if the management program 22 performs settings of the management target devices 4, the management program 22 sets the devices with device setting information that is received via an input device of the management server 2, and generates or updates the management target configuration information 31.

In addition, in this embodiment, the management target configuration information 31 is described as being stored in the secondary storage 11 but may also be stored in the memory 10, for example, rather than the secondary storage 11.

The rule segment repository 23 is a repository for storing and managing one or more rule segments 72 created using the rule information 30 on the basis of the management program 22. The rule segment repository 23 also stores segment reference information 73, which is reference history information that is generated when the memory 10 is read to in response to an event generated in the management target device group 3.

The segment reference information 73 is information with which the management server 2 manages the storage location of each rule segment 72 and, as shown in FIG. 16, for example, is configured from each of the following information: a segment ID 73A, a storage site 73B, and rule identification information 73C.

Among this information, the segment ID 73A is an identifier that is provided to the corresponding rule segment 72 (called the segment ID hereinbelow), and the storage site 73B indicates the storage site of the corresponding rule segment 72 in the rule segment repository 32. The storage site 73B of the rule segment 72 is expressed by means of a combination of a URN (Universal Resource Name) capable of specifying the position of resources such as file names and the storage location within the resource (the logical address or physical address or the like).

Furthermore, the rule identification information 73C represents identification information of the rule information 30 corresponding to the rule segment 72 (this information will be called a 'rule information identifier' hereinbelow). Hence, in the example of FIG. 16, it can be seen that the rule segment 72 of the segment ID 'X1-10a_seg' is stored in an address location '1af00' in the file 'file://C:¥:¥seg_repo01' and the identifier of the rule information 30 in which the rule segment is contained is 'X1.'

Note that the storage site of the rule segment 72 may be a file in the file system, a database of the database system, or a resource on the network (file system, block storage): the form of storage is unimportant. However, it is required that adequate information be used to specify the storage site 73B.

The segment link information 33 is information for managing which object of a particular rule segment 72 that each object (event object 72A, condition object 72B, rule object 72C, and conclusion object 72D) is linked to and so on, the objects being formed based on the items of rule information 30 in the secondary storage 11 of the management server 2 for the rule segment 72 and, as shown in FIG. 17, is configured from each of the following information: an object type 33A, identification information 33B, a link destination segment ID 33C, a link destination object ID 33D, and a reading status 33E.

Among these information items, the object type 33A denotes the type ('event,' 'condition,' 'rule,' or 'conclusion') of the corresponding object, and the identification information 33B denotes the identifier of the object (called the object ID hereinbelow). Furthermore, the link destination segment ID 33C denotes the segment ID of the rule segment 72 to which the object belongs, and the link destination object ID 33D denotes the object ID of the object, within the rule segment 72, to which the object is linked.

In addition, the reading status 33E indicates whether the object has currently been read to the memory 10. If the object has been read to the memory 10, for example, the reading status is set to "LOADED," and if the object has not been read to memory, the reading status is set to "NOT."

Therefore, in the case of FIG. 17, which relies on FIG. 7, it can be seen that the conclusion object 72D (FIG. 12) 'Y1,' for example, is associated with the rule segment 72 'X1-10a-seg' that includes the rule object 72C (FIG. 12) 'X1,' and is linked to the rule object 72C 'X1_ID' in the rule segment 72, and that the rule segment 72 has already been read ('LOADED') to the memory 10.

Note that, in FIG. 17, a plurality of rows corresponding to the rule object 72C 'X1' exist and this is an example of a case where the conditions 64 (FIG. 4) of the condition part 62 of the rule information 30 is divided into a plurality of rule segments 72, and is linked to one rule object 72C when constructing the partial rule parsing network 20.

The event object table 34 is a table that stores a latest event object 72A when the management program 22 creates the rule segment 72 from the rule information 30. Details of the event object table 34 are omitted here.

Meanwhile, the segment reference history information 35 is information for determining and selecting rule segments 72 that are referenced by the management program 22 and, as shown in FIG. 18, is configured from each of the following information: a segment ID 35A, rule identification information 35B, a lock status 35C, a counter 35D, an average read interval 35E, and a latest reference time 35F.

Among these information components, the segment ID 35A represents the segment ID of the corresponding rule segment 72, and the rule identification information 35B represents the object ID of the rule object 72C that belongs to the rule segment 72. Further, the lock status 35C indicates the status of the rule segment 72C. Note that the 'rule segment status' will be described subsequently.

In addition, the counter 35D indicates the period, counted by a counter (not shown), in which the corresponding rule segment 72 is not referenced, and the average read interval 35E indicates the average reference interval of the rule segment 72 of which a fixed period defined by the management program 22 is one unit. In addition, the latest reference time 35F represents the time at which the rule segment 72 is finally referenced. Note that the segment reference history information 35 may include information relating to another reference history.

Hence, for instance in the example of FIG. 18, it can be seen that the rule segment 72 'X1-10a_seg' is generated on the basis of the rule information 30 'X1,' the current status is 'locked,' the counter value is '0,' the average reference interval is '15.0,' and the latest reference time is '2009:11.'

Note that the values for the average read interval 35E and the latest reference time 35F of the segment reference history information 35 are utilized as references for selection in a case where any of the rule segments 72 with the same lock status 35C are removed. For instance, segments selected as targets for removal are those segments that have a large average read interval 35E and those segments that have an old latest reference time 35F.

(2-3) Various Processing Executed by the Processor of the Management Server

Various processing that is executed by the management program 22 of the management server 2 and relating to a fault cause parsing function of this embodiment will be described next.

(2-3-1) Fault Cause Parsing Processing

Figure 19:
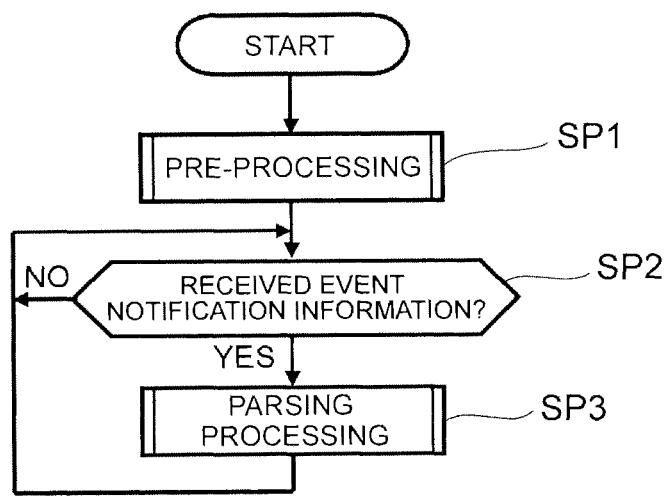
FIG. 19 is a flowchart showing a processing procedure for a fault cause parsing processing procedure.

FIG. 19 shows a processing procedure of fault cause parsing processing that is executed by the management program 22 relating to the fault cause parsing function of this embodiment.

When the management server 2 is started up, the management program 22 starts the fault cause parsing processing shown in FIG. 19, first reads the rule information 30 from the secondary storage 11 (FIG. 1) and creates rule segments 72, segment link information 33 (FIG. 1) and event index information 21 (FIG. 1) on the basis of the rule information 30 thus read (SP 1). Thereupon, the event index information 21 is generated in the secondary storage 11 at first, and after that, read to the memory 10.

Thereafter, the management program 22 starts to monitor and manage the management target device group 3 and awaits the transmission of an event notification 50 from any of the management target devices 4 contained in the management target device group 3 (SP 2).

When before long the event notification 50 is transmitted from any of the management target devices 4, the management program 22 parses the content of the event notification 50 on the basis of the event notification 50 and information relating to the rule segment 72 stored in the rule segment repository 32 in the secondary storage 11 (SP 3).

More specifically, the management program 22 reads the related rule segments 72 to the memory 10, refers to the segment link information 33 and constructs the partial rule parsing network 20 (FIG. 1) in the memory 10. Furthermore, the management program 22 uses the constructed partial rule parsing network 20 to perform parsing processing of the detected event. The reference history information of the rule segments 72 read by this processing is registered or updated as segment reference information 73. Note that the segment link information 33 may also be read to the memory 10 in this processing.

Further, the management program 22 returns to step SP 2 and then repeats the processing of step SP 2 and step SP 3 above.

(2-3-2) Pre-Processing

Figure 20:
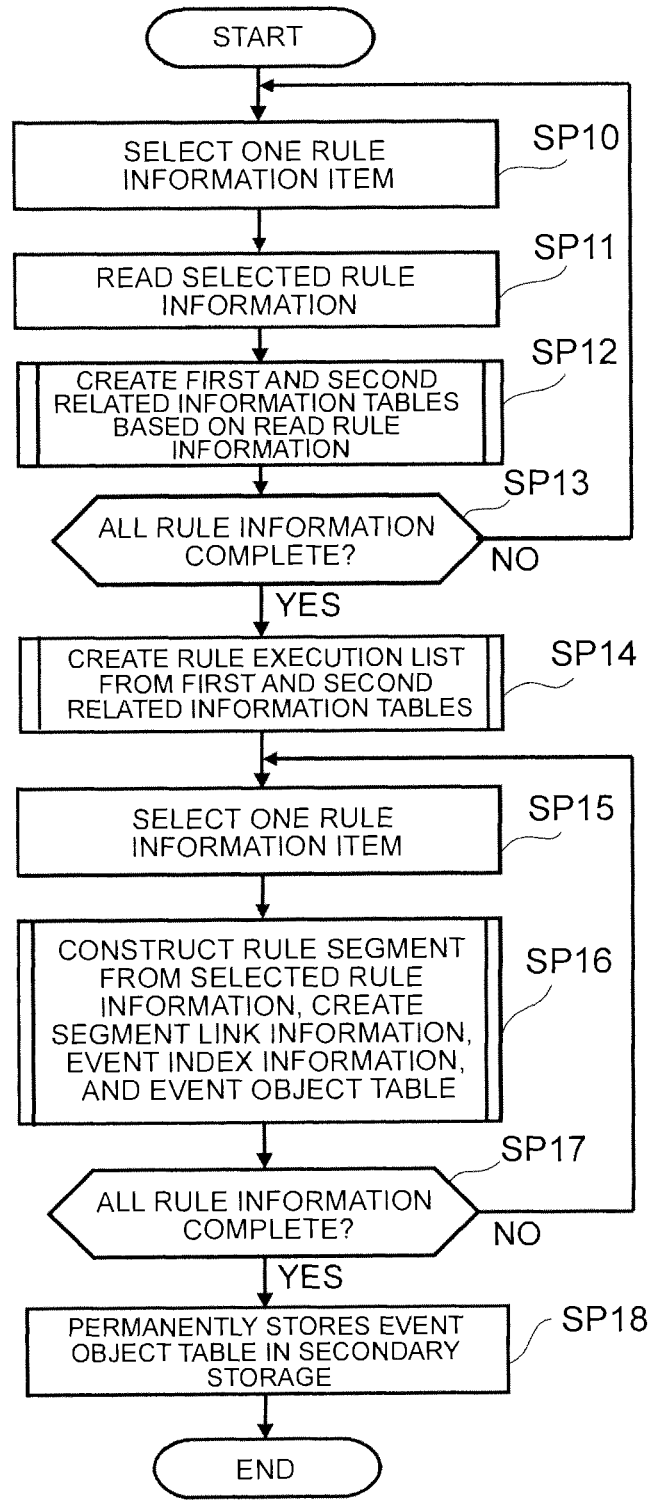
FIG. 20 is a flowchart showing a pre-processing processing procedure.

FIG. 20 shows a specific processing procedure for processing (called pre-processing hereinbelow) that is executed by the management program 22 in step SP 1 of the fault cause parsing processing (FIG. 1). The management program 22 creates one or more rule segments 72, segment link information 33, and event index information 21 and so forth on the basis of the rule information 30 stored in the secondary storage 11 in accordance with the processing procedure shown in FIG. 20.

In other words, the management program 22 starts the pre-processing upon advancing to step SP 1 of the fault cause parsing processing, first selects one item of rule information from the one or more items of rule information 30 stored in the secondary storage 11 (SP 10), and reads the selected rule information 30 to the memory 10 from the secondary storage 11 (SP 11).

Thereafter, the management program 22 registers, for the rule information 30 read to the memory 10 in step SP 11, the event ID 65A (FIG. 4) of the events included in the event information 65 (FIG. 4) of the conditions 64 (FIG. 4) of the condition part 62 (FIG. 4) of the rule information 30 and the rule identification information 61 (FIG. 4) of the rule information 30 in an event ID field 80A and a rule identification information field 80B of a first related information table 80 shown in FIG. 21 (SP 12).

Furthermore, the management program 22 registers, for the rule information 30 read to the memory 10 in step SP 11, an event ID 67A (FIG. 4) of the event contained in the event information 67 (FIG. 4) of the conclusion part 63 (FIG. 4) and rule identification information 61 (FIG. 4) of the rule information 30 in an event ID field 81A and a rule identification information field 81B of a second related information table 81 shown in FIG. 22 (SP 12).

Thereafter, the management program 22 determines whether or not the processing of step SP 12 has been completed for all the rule information 30 stored in the secondary storage 11 (SP 13). Further, when a negative result is obtained in this determination, the management program 22 returns to step SP 10 and then repeats the processing of steps SP 10 to SP 13 while sequentially selecting other rule information 30 in step SP 10.

Furthermore, if an affirmative result is obtained in step SP 13 when before long the processing of step SP 12 is complete for all the rule information 30 that is stored in the secondary storage 11, the management program 22 creates a rule execution list that determines the ranking order of the rule information 30 for executing the processing of steps SP 15 to SP 17 (described subsequently) on the basis of the first and second related information tables 80, 81 created in step SP 12 (SP 14).

This rule execution list is a list for checking the interdependency of rule information 30 and for controlling the order of execution for inter-dependent rules. The interdependency of rule information 30 refers to a relationship in which an event retained by the conclusion part 63 of a certain first item of rule information 30 is maintained is an event retained by the condition 64 of the condition part 62 of another second item of rule information 30. In the following description, the first rule information 30 in this case will be called the 'child' of the second rule information 30 and the second rule information 30 will be called the 'parent' of the first rule information 30.

Thereafter, the management program 22 selects one item of rule information 30 from among one or more item of rule information 30 stored in the secondary storage 11 (SP 15) and constructs a rule segment 72 on the basis of the selected rule information 30. Furthermore, in so doing, the management program 22 creates segment link information 33 (FIG. 1), event index information 21 (FIG. 1), and an event object table 34 (FIG. 1) (SP 16).

The management program 22 then determines whether or not all the processing of step SP 16 is complete for all the rule information 30 stored in the secondary storage 11 (SP 17). Further, when a negative result is obtained in this determination, the management program 22 returns to step SP 15 and then repeats the processing of steps SP 15 to SP 17 while sequentially selecting other rule information 30 in step SP 15.

Thereafter, if an affirmative result is obtained in step SP 17 when before long the processing of step SP 16 is complete for all the rule information 30 stored in the secondary storage 11, the management program 22 outputs a latest event object table 34 created by the processing of steps SP 15 to SP 17 to the secondary storage 11 (SP 18). The event object table 34 is then permanently stored in the secondary storage 11 and used during subsequent parsing processing (step SP 3 of FIG. 19).

(2-3-3) Related Information Table Creation Processing

Figure 23:
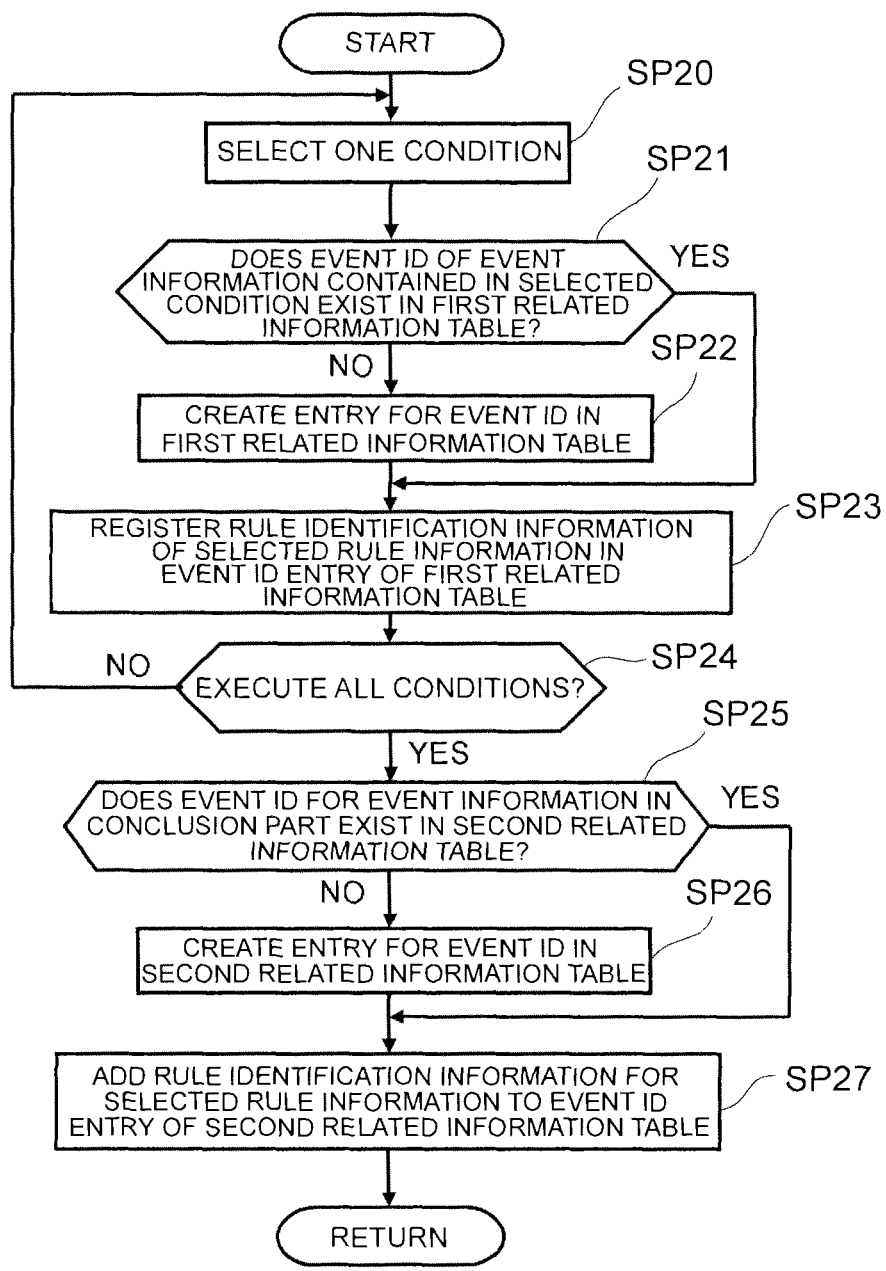
FIG. 23 is a flowchart showing a processing procedure for related information table creation processing.

FIG. 23 shows specific processing content of the management program 22 in step SP 12 of the pre-processing described earlier in FIG. 19. The management program 22 creates first and second related information tables 80 and 81 in accordance with the processing procedure shown in FIG. 23.

In other words, upon advancing to step SP 12 of the pre-processing, the management server 80 starts the related information table creation processing shown in FIG. 23 and first selects one condition 64 that is contained in the condition part 62 of the rule information 30 shown in FIG. 4 that is read in pre-processing step SP 11 (SP 20).

The management program 22 then determines whether or not an entry of the event ID 65A of the event information 65 that is included in the selected condition 64 exists in the first related information table 80 (SP 21), and advances to step SP 23 when an affirmative result is obtained.

However, when a negative result is obtained in the determination of step SP 21, the management program 22 creates an entry for the event ID 65A in the first related information table 80 (SP 22) and stores the rule identification information 61 (FIG. 4) of the rule information 30, that is read in step SP 11 of the pre-processing (FIG. 20), in the rule identification information field 80B (FIG. 21) for this entry (SP 23).

The management program 22 then determines whether or not the processing of steps SP 21 to SP 23 is complete for all the conditions 64 contained in the rule information 30 that is read in pre-processing step SP 11 (SP 24). The management program 22 returns to step SP 20 once a negative result is obtained in this determination, and then repeats the processing of steps SP 20 to SP 24 while sequentially selecting another condition in step SP 20 until an affirmative result is obtained in step SP 24.

If an affirmative result is obtained in step SP 24 when before long the processing of steps SP 21 to SP 23 is complete for all the conditions 64 contained in the rule information 30 read in pre-processing step SP 11, the management program 22 then determines whether or not an entry of the event ID 67A of the event information 67 (FIG. 4) contained in the conclusion part 63 of the rule information 30 exists in the second related information table 81 (SP 25).

The management program 22 advances to step SP 27 when an affirmative result is obtained in this determination. However, when a negative result is obtained in the determination of step SP 25, the management program 22 creates an entry of the event ID 67A in the second related information table 81 (SP 26), and stores the rule identification information 61 of the rule information 30 read in pre-processing step SP 11 in the rule identification information field 81B for this entry (SP 27).

Figure 24:
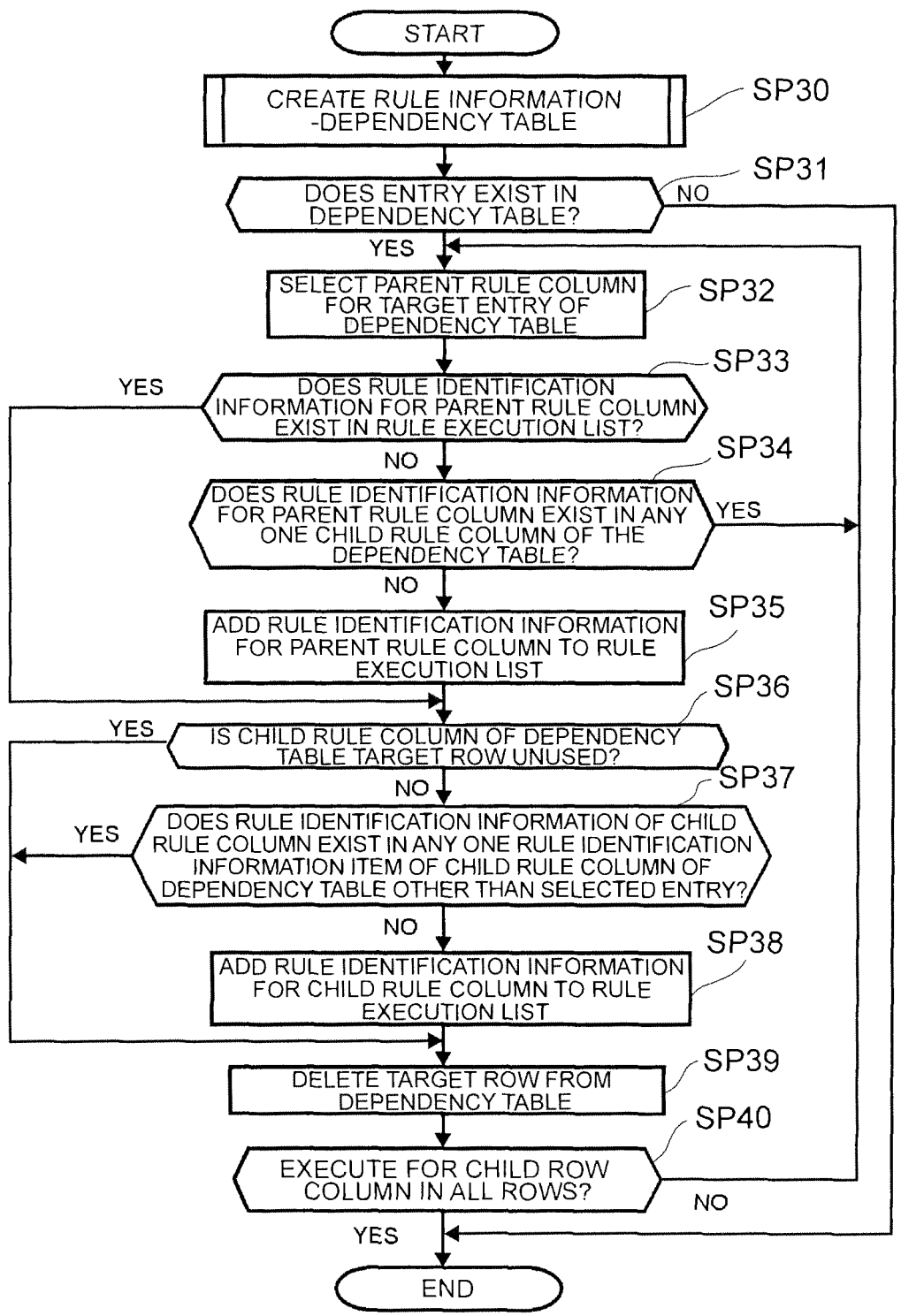
FIG. 24 is a flowchart showing a processing procedure for a rule execution list creation processing.

The management program 22 then advances to pre-processing step SP 13 upon completing the related table creation processing (2-3-4) The Rule Execution List Creation Processing However, FIG. 24 shows a specific processing procedure for the rule execution list creation processing that is executed by the management program 22 in step SP 14 of the pre-processing (FIG. 20). The management program 22 creates the rule execution list on the basis of the first and second related information tables 80 and 81 in accordance with the processing procedure shown in FIG. 24. Note that the rule execution list is a list in which event IDs are registered in order.

In other words, upon advancing to pre-processing step SP 14, the management program 22 starts rule execution list creation processing and first creates a rule information dependency management table 82, shown in FIG. 25, by referring to the first and second related information tables 80 and 81 (SP 30).

The rule information dependency management table 82 is a table for managing the parent relationships between rule information 30, and is configured from a parent rule column 82A and a child rule column 82B as shown in FIG. 25. The management program 22 then stores rule identification information 61 (FIG. 4) of the 'parent' rule information 30 among these two items of rule information 30 in a parent relationship in the parent rule column 82A, and stores rule identification information 61 of 'child' rule information 30 of this rule information 30 in the child rule column 82B.

The management program 22 then determines whether or not an entry (row) exists in the rule information dependency management table 82 (SP 31) and ends the rule execution list creation processing when a negative result is obtained.

However, upon obtaining an affirmative result in the determination of this step SP 31, the management program 22 selects one entry (SP 32) and determines whether or not the rule identification information stored in the parent rule column 82A of the selected entry has already been registered in the rule execution list (SP 33).

The management program 22 advances to step SP 36 when an affirmative result is obtained in this determination. However, when a negative result is obtained, the management program 22 determines whether or not the rule identification information 61 stored in the parent rule column 82A of the entry selected in step SP 32 is stored in the child rule column 82B of any entry in the rule information dependency management table 82 (SP 34).

The management program 22 returns to step SP 32 when an affirmative result is obtained in this determination; however, when a negative result is obtained, the management program 22 adds the rule identification information stored in the parent rule column 82A of the entry selected in step SP 32 to the rule execution list (SP 35).

Thereafter, the management program 22 determines whether or not the child rule column 82B for that entry that is then the target in the rule information dependency management table is unused (the rule identification information is not stored, that is, the child rule does not exist) (SP 36).

When an affirmative result is obtained in this determination, the management program 22 advances to step SP 39; however, when a negative result is obtained, the management program 22 determines whether or not the rule identification information stored in the child rule column 82B of the entry selected in step SP 32 is the same and is stored in the child rule column 82B of any other entry (SP 37).

Furthermore, the management program 22 advances to step SP 39 when an affirmative result is obtained in this determination; however, when a negative result is obtained, the management program 22 adds the rule identification information stored in the child rule column 82B of the entry selected in step SP 32 to the rule execution list (SP 38).

Thereafter, the management program 22 deletes the entry selected in step SP 32 from the rule information dependency management table 82 (SP 39) and determines whether or not the processing of steps SP 32 to SP 39 is complete for all the entries of the rule information dependency management table 82 (SP 40).

The management program 22 returns to step SP 32 when a negative result is obtained in this determination, and then repeats the processing of steps SP 32 to SP 40 while the entry selected in step SP 32 is sequentially switched to another entry.

Furthermore, if an affirmative result is obtained in step SP 40 when before long the processing of steps SP 32 to SP 40 is complete for all the entries of the rule information dependency management table 82, the management program 22 terminates this rule execution list creation processing and advances to step SP 15 of the pre-processing (FIG. 20).

(2-3-5) Rule Information Dependency Management Table Creation Processing

Figure 26:
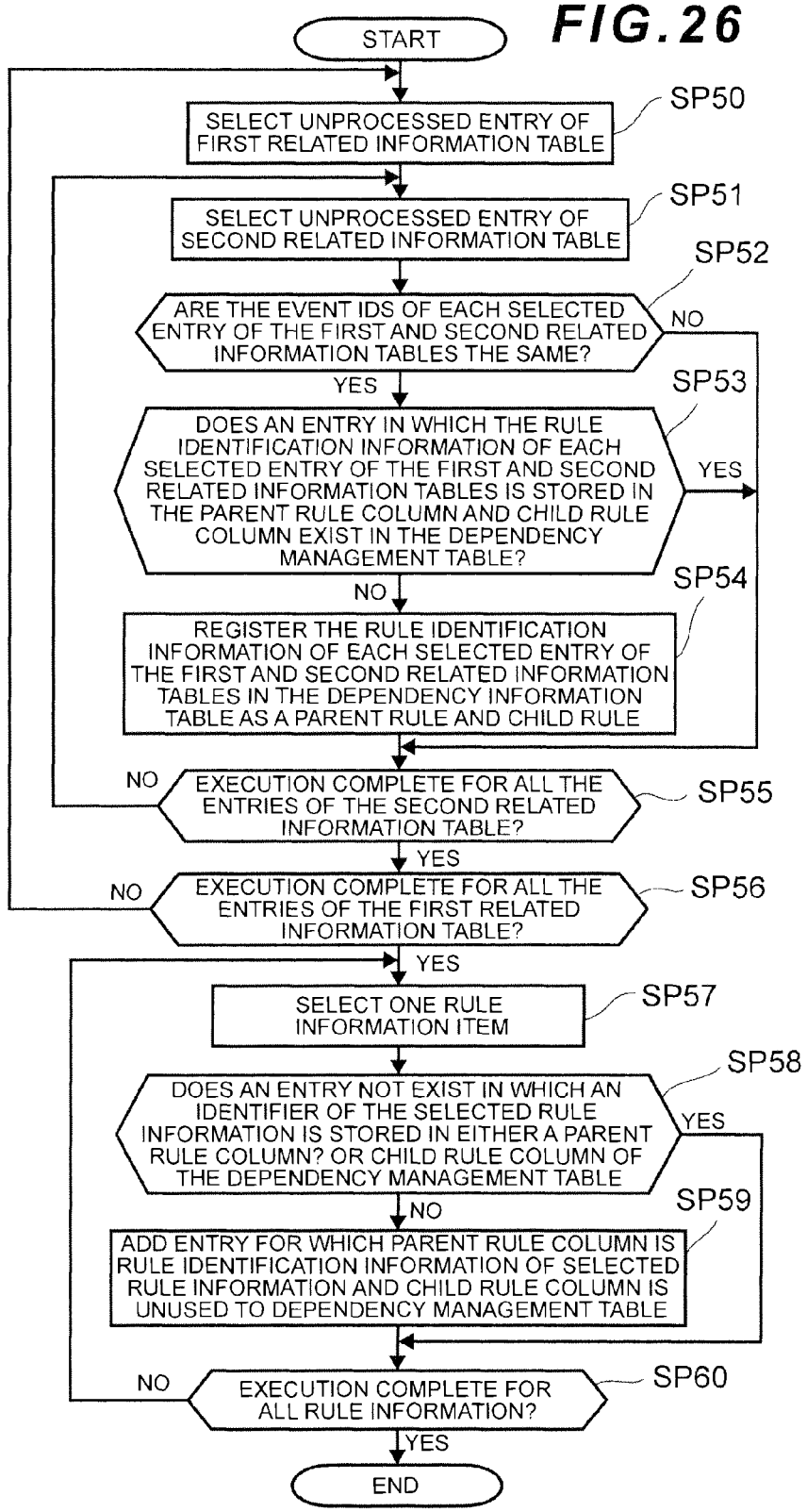
FIG. 26 is a flowchart showing a processing procedure for rule information-dependency management table creation processing.

Meanwhile, FIG. 26 shows a specific processing procedure for the rule information dependency management table creation processing that is executed by the management program 22 in step SP 30 of the rule execution list creation processing (FIG. 24). The management program 22 creates the rule information dependency table 82 in accordance with the processing procedure shown in FIG. 26.

In other words, upon advancing to step SP 30 of the rule execution list creation processing, the management program 22 starts the rule information dependency management table creation processing and first selects one of the unprocessed entries of the first related information table 80 (FIG. 21) (SP 50).

The management program 22 then selects one unprocessed entry of the second related information table 81 (FIG. 22) (SP 51) and then determines whether or not the event ID stored in the event ID field 80A of the entry in the first related information table 80 selected in step SP 50 is the same as the event ID stored in the event ID field 81A of the entry of the second related information table 81 selected in step SP 51 (SP 52).

The management program 22 advances to step SP 55 when a negative result is obtained in this determination. However, upon obtaining an affirmative result in this determination, the management program 22 determines whether or not, among the entries in the rule information dependency management table 82, the rule identification information field 80B of the entry of the first related information table 80 selected in step SP 50 is stored in the parent rule column 82A, and whether an entry exists in which the rule identification information field 81B of the entry of the second related information table 81 selected in step SP 51 is stored in the child rule column 82B (SP 53).

The management program 22 advances to step SP 55 when a negative result is obtained in the determination; however, when an affirmative result is obtained in this determination, the management program 22 creates a new entry in the rule information dependency management table 82, stores the rule identification information stored in the rule identification information field 80B of the entry of the first related information table 80 selected in step SP 50 in the parent rule column 82A for this entry, and stores the rule identification information stored in the rule identification information field 81B of the entry of the second related information table 81 selected in step SP 51 in the child rule column 82B of this entry (SP 54).

Thereafter, the management program 22 determines whether the processing of steps SP 51 to SP 54 is complete for all the entries of the second related information table 81 (SP 55). Furthermore, the management program 22 returns to step SP 51 when a negative result is obtained in this determination and then repeats the processing of steps SP 51 to SP 55 while sequentially switching the entry selected in step SP 51 to another entry.

If an affirmative result is obtained in this step SP when before long the processing of steps SP 51 to SP 55 is complete for all the entries of the second related information table 81, the management program 22 then determines whether or not the processing of steps SP 50 to SP 55 is complete for all the entries of the first related information table 80 (SP 56).

The management program 22 returns to step SP 50 when a negative result is obtained in this determination and then repeats the processing of steps SP 50 to SP 56 while sequentially switching the entries selected in step SP 50 to another entry.

If an affirmative result is obtained in step SP 56 when before long the processing of steps SP 50 to SP 56 is complete for all the entries of the first related information table 81, the management program 22 then selects one item of rule information 30 from the rule information 30 stored in the secondary storage 11 (SP 57).

The management program 22 then determines whether or not an entry that stores the rule information identifier of the rule information 30 selected in step SP 57 exists in either of the parent rule column 82A and the child rule column 82B of the rule information dependency management table 82 (SP 58).

The management program 22 advances to step SP 60 when the affirmative result is obtained in this determination; however, when a negative result is obtained, the rule information identifier of the rule information 30 selected in step SP 57 is stored in the parent rule column 82A and adds an entry with an unused child rule column 82B to the rule information dependency management table 82 (SP 59).

The management program 22 then determines whether the processing of steps SP 57 to SP 60 is complete for all the rule information 30 stored in the secondary storage 11 (SP 60). The management program 22 returns to step SP 57 when a negative result is obtained in this determination, and then repeats the processing of steps SP 57 to SP 60 while sequentially selecting other rule information 30 in step SP 57.

If an affirmative result is obtained in step SP 60 when before long the processing of steps SP 57 to SP 60 is complete for all the rule information 30 stored in the secondary storage 11, the management program 22 then terminates the rule information dependency management table creation processing.

(2-3-6) Processing to Create Rule Segments or the Like

Figure 27:
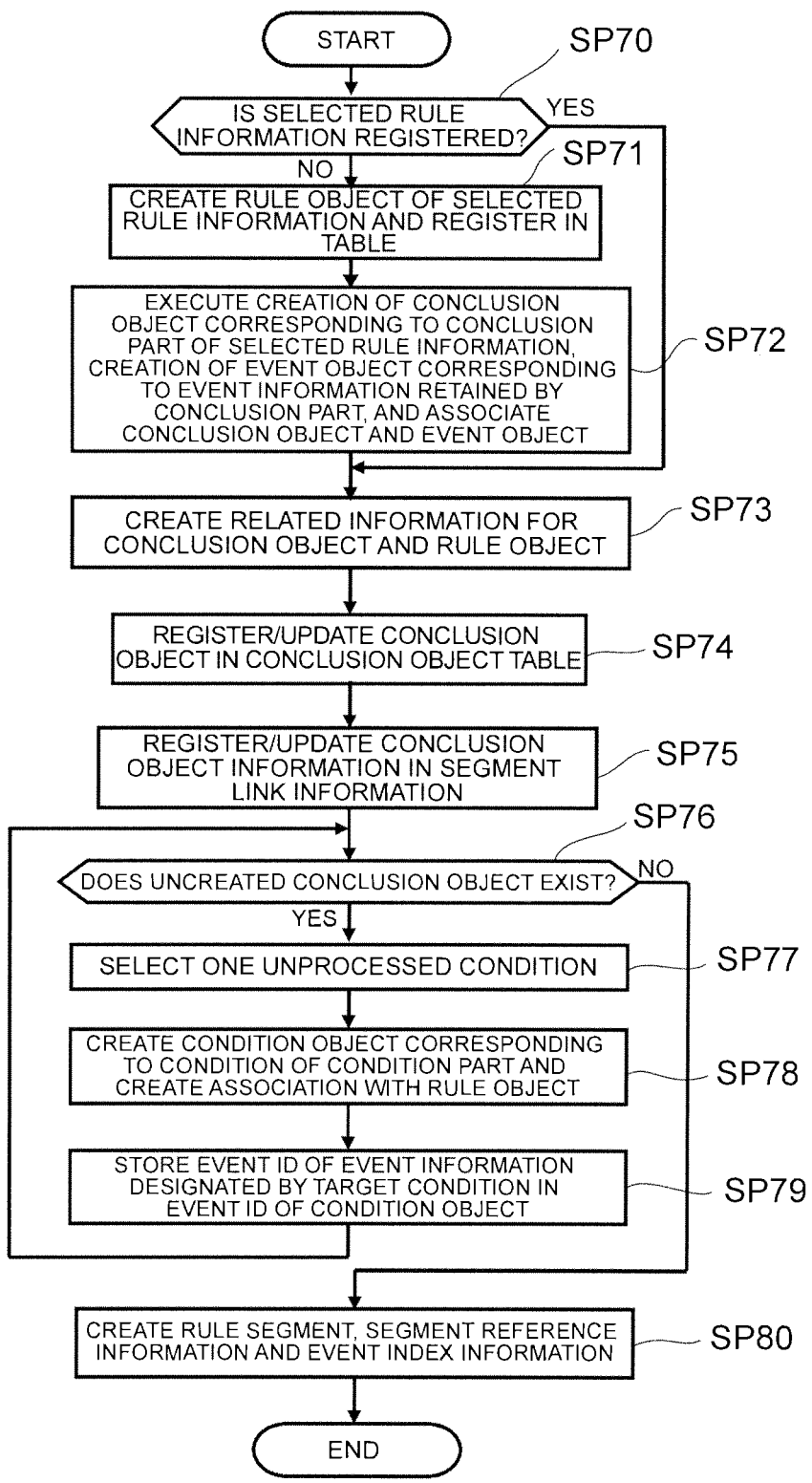

FIG. 27 shows the processing procedure for processing to create rule segments or the like that is executed by the management program 22 in pre-processing step SP 16 described in FIG. 20 above. The management program 22 creates each of the rule segments 72 (FIG. 12), the event index information 21 (FIG. 15), the segment link information 33 (FIG. 17) and the event object table 34 in accordance with the processing procedure shown in FIG. 20.

Note that, in the processing execution process of the rule segment creation processing shown in FIG. 27, a rule object table (not shown) of a data structure that stores a plurality of rule objects 72C (FIG. 12) in the memory 10 of the management server 2, a conclusion object table (not shown) of a data structure that stores a plurality of conclusion objects 72D (FIG. 12), and an event object table (not shown) of a data structure that stores a plurality of event objects 72A (FIG. 12) are created. The rule object table, the conclusion object table, and the event object table are each unused with respect to content in an initial state.

Upon advancing to pre-processing step SP 16, the management program 22 starts the rule segment creation processing and first determines whether or not the rule object 72C corresponding to the rule identification information 61 (FIG. 4) of the rule information 30 selected in step SP 15 is registered in the rule object table (SP 70).

The management program 22 advances to step S73 when an affirmative result is obtained in this determination; however, when a negative result is obtained, the management program 22 creates the rule object 72C and registers the rule object 72C thus created in the rule object table (SP 71).

The management program 22 then creates a conclusion object 72D corresponding to the conclusion part 63 (FIG. 4) of the rule information 30 selected in pre-processing step SP 15, creates the event object 72A corresponding to the event information 67 (FIG. 4) contained in the conclusion part 63 and associates the conclusion object 72D and event object 72A thus created (SP 72).

Thereafter, the management program 22 associates the rule object 72C created in step SP 71 with the conclusion object 72D created in step SP 72 (SP 73), and then registers the conclusion object 72D created in step SP 72 in the conclusion object table or updates the corresponding conclusion object already registered in the conclusion object table (SP 74).

In addition, the management program 22 registers required information relating to this conclusion object 72D in the segment link information 33 (FIG. 17) or updates the corresponding conclusion object 72D already registered in the segment link information 33 (SP 75), and then determines whether or not a condition 64 (FIG. 4) that a corresponding condition object 72B (FIG. 13) is not created exists in the rule information 30 selected in the pre-processing step SP 15 (SP 76).

When an affirmative result is obtained in this determination, the management program 22 selects one unprocessed condition 64 among the conditions 64 contained in the condition part 62 (FIG. 4) of this rule information 30 (SP 77). The management program 22 then creates a condition object 72B corresponding to the condition 64, and associates the condition object 72B with the rule object 72C created in step SP 71 (SP 78).

The management program 22 subsequently stores an event ID 65A (FIG. 4) contained in the event information 65 (FIG. 4) of the condition 64 selected in step SP 77 as an event ID 72BD (FIG. 13) of the condition object 72B created in step SP 78 (SP 79). Furthermore, the management program 22 returns to step SP 76 and then repeats the processing of steps SP 76 to SP 79 until an affirmative result is obtained in step SP 76.

Further, if a negative result is obtained in step SP 76 when the creation of a corresponding condition object 72B is complete for all the conditions 64 contained in the condition part 62 of the rule information 30 selected in pre-processing step SP 15, the management program 22 then stores a rule segment 72 which is configured by the rule object 72C corresponding to the rule information 30 selected in pre-processing step SP 15, the condition object 72B and the conclusion object 72D that are associated with the rule object 72C, and the event object 72A in the rule segment repository 32 (FIG. 1) in the secondary storage 11. Furthermore, the management program 22 assigns a segment ID to the created rule segment 72, and creates reference information for the rule segment 72 that comprises the segment ID and storage site of the rule segment 72, and rule identification information of the corresponding rule information 30 (SP 80). This reference information is subsequently incorporated in the segment reference information 73 of FIG. 16.

In addition, the management program 22 creates an event ID 72BD (FIG. 13) that is retained by the condition object 72B forming part of the rule segment 72, and event index information representing a correspondence relationship with the segment ID of the rule segment 72 (SP 80). This event index information is then incorporated into the event index information 21 (FIG. 15) of FIG. 15.

As a result of the foregoing processing, the rule segment 72, the segment link information 33, and the event index information 21 are created.

(2-3-7) Parsing Processing

Figure 28:
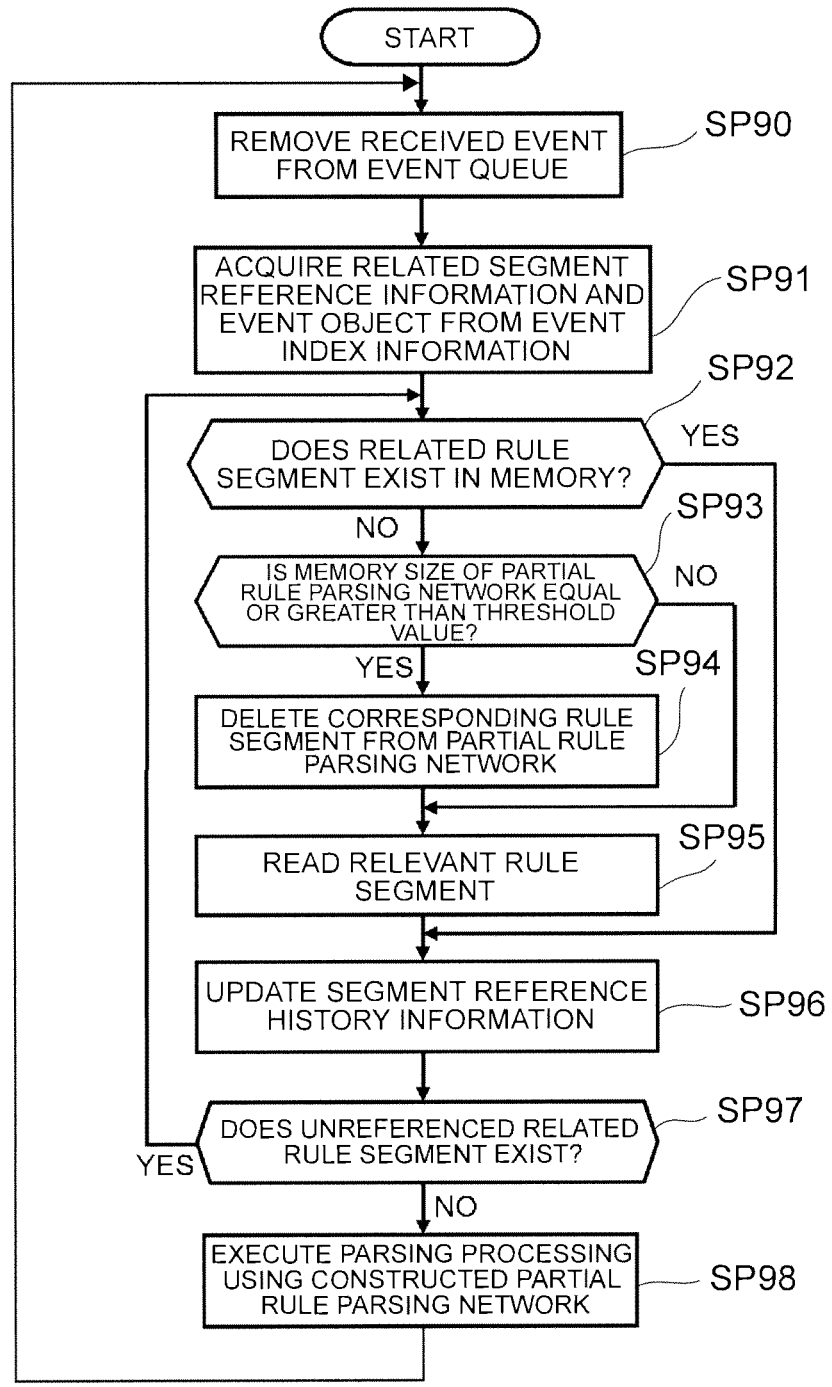
FIG. 28 is a flowchart showing a processing procedure for parsing processing.

Meanwhile, FIG. 28 shows a specific processing procedure for the parsing processing that is executed by the management program 22 in step SP 3 of the fault cause parsing processing described hereinabove in FIG. 19.

When advancing to step SP 3 of the fault cause parsing processing, the management program 22 starts the parsing processing shown in FIG. 28, and first, extracts event notifications 50 (FIG. 3) received until the time from the event queue 23 (FIG. 1) (SP 90), and, taking the event ID 50A (FIG. 3) contained in the event notification 50 thus removed as a search key, the management program 22 acquires the segment ID of the related rule segment 72 from the event index information 21 (FIG. 15) and acquires an event object 72A (FIG. 12) from the event object table 34 (FIG. 1) (SP 91).

The management program 22 then determines, based on the read status 21C contained in the event index information 21 (FIG. 15), whether or not the related rule segment 72 has been read to the memory 10 from the secondary storage 11 (SP 92) and when an affirmative result is obtained, advances to step SP 96.

However, when a negative result is obtained in the determination of step SP 92, the management program 22 then acquires used memory capacity of the partial rule parsing network 20 (FIG. 1) that is configured from all the rule segments 72 read to the memory 10, and determines whether or not the used memory capacity is equal to or more than a preset threshold value (SP 93).

The management program 22 advances to step SP 95 when a negative result is obtained in the determination; however, when an affirmative result is obtained, the management program 22 removes a portion of the rule segments 72 that form the partial rule parsing network 20 in the memory 10 from the memory 10 (SP 94).

Note that a variety of methods may be considered for the method of selecting rule segments 72 that are to be cleared from the memory. However, in this embodiment, a status is defined on the basis of the reference condition of the rule segments 72 and the rule segments 72 to be removed are determined using information such as a defined status and the number of times and/or the frequency with which the rule segments are referred to and so forth. The removal of a rule segment 72 is performed by deleting all references to the rule segment 72, and if memory management can be controlled directly, is performed by directly releasing the read address of the rule segment 72.

The management program 22 subsequently reads the rule segment 72 subjected to the determination in step SP 92 to the memory 10 from the rule segment repository 32 (FIG. 1) in the secondary storage 11 (SP 95). At this time, the management program 22 performs reading by acquiring the storage location of the corresponding rule segment 72 from the segment reference information 73 (FIG. 16) in the rule segment repository 32 with the segment ID serving as the search key. After reading the rule segment 72, a cross-reference between the event index information 21 (FIG. 15) and the event object 72A created in step SP 91 is created, thereby cross-referencing and linking the event index information 21, the event object 72A, and then the read rule segment 72.

The management program 22 then updates the latest reference time 35F (FIG. 18) and the lock status 35C (FIG. 18) that correspond to the rule segment 72 of the segment reference history information 35 (FIG. 18) (SP 96). The lock status 35C is set to 'evaluated,' indicating that the rule segment 72 is currently being parsed by a parsing processing program. The lock status 35C is changed to 'locked' if the rule segment 72 is actually inserted into a scope for execution by the management program 22. A detailed description of the status transition is provided subsequently using FIG. 29.

The management program 22 subsequently determines whether or not reading from the secondary storage 11 is complete for all the rule segments 92 that are related to the event reported by the targeted event notification 50 (the event notification 50 read from the event queue 23 in step SP 90) (SP 97). This determination is made by the management program 22 depending on whether the read status 33E in the segment link information 33 (FIG. 17) is 'NOT' for the object in the rule segment that was read in step SP 95.

The management program 22 returns to step SP 90 when an affirmative result is obtained in this determination and then executes processing of steps SP 90 to SP 97 for related rule segments 72 that have not been referenced.

Furthermore, if a negative result is obtained in step SP 97 when before long the processing of steps SP 90 to SP 97 is complete for all the rule segments 72 related to the event reported by the event notification 50 taken from the event queue 23 in step SP 90, the management program 22 then performs a parsing using the partial rule parsing network 20 (FIG. 1) constructed by the processing above. The management program 22 also displays the parsing result on the management server 2 or notifies the system administrator by mail (SP 98). The management program 22 then ends the parsing processing.

(2-4) Rule Segment Status Transitions

Figure 29:
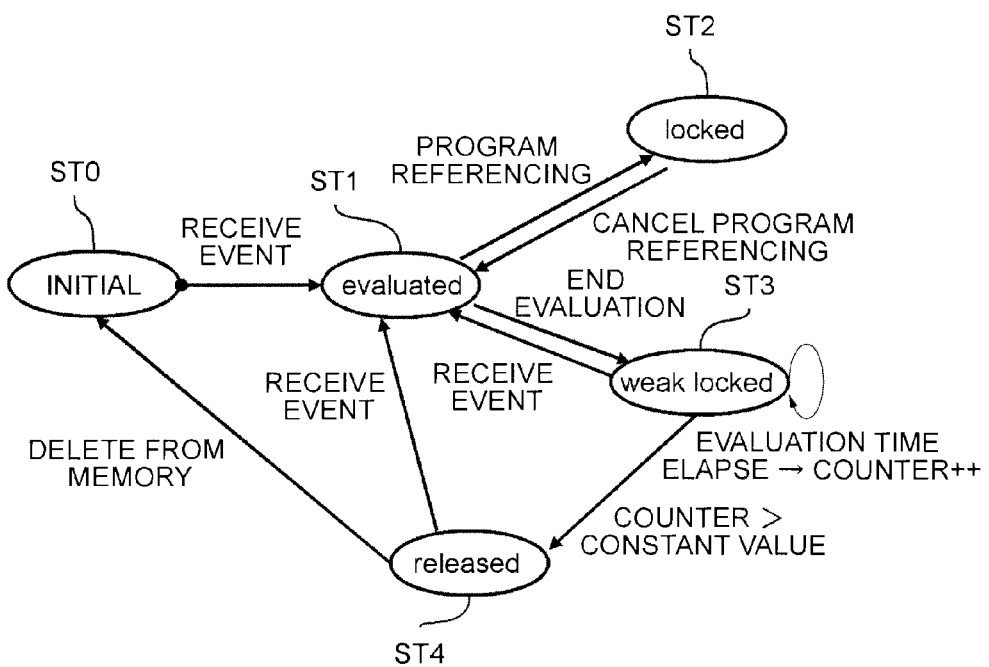
FIG. 29 is a conceptual view serving to explain rule segment status transitions.

FIG. 29 is an example that is defined for the status transition of the rule segment 72. As shown in FIG. 29, the rule segment 72 has five statuses, namely, 'INITIAL,' 'evaluated,' 'locked,' 'weak locked,' and 'released.'

Among these statuses, 'INITIAL' represents the initial status of the rule segment 72, 'evaluated' denotes a status where the rule segment 72 is now an evaluation target, and 'locked' denotes a status where the rule segment 72 is locked. Further, 'weak locked' denotes a status where the rule segment 72 is weakly locked, and 'released' denotes a status where the rule segment 72 is now a release target.

The status of the rule segment 72 is 'INITIAL' at the start, and shifts to 'evaluated' at the stage where an event notification 50 is received notifying an event relating to the rule segment 72. Furthermore, subsequently when the rule segment 72 enters an execution scope of the management program 22, the status of the rule segment 72 shifts to 'locked,' and when the parsing processing using the partial rule parsing network 20 to which the rule segment 72 belongs is complete, the status of the rule segment 72 shifts from 'evaluated' to 'weak locked.'

In addition, if a related event has not been received for a fixed time after the status 'weak locked' is assumed, the status of the rule segment 72 shifts to 'released.' Furthermore, if an event notification 50 is received for an event with which the rule segment 72 is associated, the status shifts to 'evaluated' even in a case where the rule segment 72 is in a 'weak locked' or 'released' status.

Of these statuses 'INITIAL,' 'evaluated,' 'locked,' 'weak locked' and 'released,' when 'INITIAL' is excluded, only 'locked' is not targeted for clearing; the other statuses, namely, 'released,' 'weak locked,' and 'evaluated' are cleared in that order.

Furthermore, among 'released,' 'weak locked,' and 'evaluated,' only 'released' can be cleared unconditionally; 'weak locked' is cleared if a 'released'-status rule segment is not present, and 'evaluated' is cleared only if a 'weak locked' status rule segment does not exist.

(3) Advantageous Effects of Embodiment

According to the information processing system 1 of this embodiment as described earlier, in the management server 2, a rule is divided into one or more rule segments 72 comprising a condition 64 and a conclusion, and when an event notification 50 from a management target device 4 is received, the partial rule parsing network 20 is constructed in the memory 10 from one or more related rule segments 72, an inference is derived on the basis of the constructed partial rule parsing network 20, and rule segments 72 that are not readily used in inference derivation are deleted from the memory 10. Hence, the memory capacity of the working memory that is required during inference derivation can be deleted and the memory capacity required for the inference derivation can be kept constant. Furthermore, the rule segments 72 based on the rule information 30 are prepared beforehand, and the partial rule parsing network 20 is constructed by linking the required rule segments 72 when an event notification 50 is received from the management target devices 4. The time until inference derivation can therefore be shortened. Accordingly, irrespective of the number of defined events and the number of rules of the target system, parsing processing can be carried out in a short parsing time while maintaining a constant working memory size.

INDUSTRIAL APPLICABILITY

The present invention manages one or more information processing devices and is widely applicable to management apparatuses that perform parsing processing on the basis of event notifications transmitted from information processing devices to be managed.

The invention claimed is:

1. A management apparatus managing a plurality of information processing devices, comprising:
a working memory storing rule segments, each rule segment comprising a condition event and a conclusion, wherein each of the rule segments are divided into entities of rules, each rule comprising a combination of condition events to be generated in the information processing devices and a conclusion inferred by the combination of condition events; and
a processor configured to:
(1) receive an event notification corresponding to a content of an event transmitted from one of the information processing devices, when the event is generated in the one information processing device;
(2) retrieve one or more of the rule segments related to the event notification and infer a certain conclusion by referencing the retrieved one or more rule segments;
(3) update a corresponding portion of rule segment management information, wherein the rule segment management information includes a reference history for each of the rule segments;
(4) select a certain one of the rule segments on the working memory which is not readily used, based on the rule segment management information; and
(5) delete the certain rule segment from the working memory.

2. The management apparatus according to claim 1, wherein the processor is configured to create segment link information which is information relating to links between the rule segments, and event index information for retrieving rule segments relating to events, and
wherein during (2), the processor refers to the segment link information and the event index information.

3. The management apparatus according to claim 1, wherein the reference history includes at least one of:
(i) a latest reference time which is the time the rule segment was last referred to,
(ii) an average read interval which is an average time interval over which the rule segment is read to the memory, and
(iii) a status of the corresponding rule segment.

4. The management apparatus according to claim 1, wherein the management apparatus stores the deleted rule segment in a storage outside of the working memory.

5. A system comprising:
a plurality of information processing apparatuses; and
a management apparatus which manages the plurality of information processing apparatuses;
wherein the management apparatus comprises:
a working memory storing rule segments, each rule segment comprising a condition event and a conclusion, wherein each of the rule segments are divided into entities of rules, each rule comprising a combination of condition events to be generated in the information processing apparatuses and a conclusion inferred by the combination of condition events; and
a processor configured to:
(1) receive an event notification corresponding to a content of an event transmitted from one of the information processing apparatuses, when the event is generated in the one information processing apparatus;
(2) retrieve one or more of the rule segments related to the event notification and infer a certain conclusion by referencing the retrieved one or more rule segments;
(3) update a corresponding portion of rule segment management information, wherein the rule segment management information includes a reference history for each of the rule segments;
(4) select a certain one of the rule segments on the working memory which is not readily used, based on the rule segment management information; and
(5) delete the certain rule segment from the working memory.

6. The system according to claim 5, wherein the processor of the management apparatus is configured to create segment link information which is information relating to links between the rule segments, and event index information for retrieving rule segments relating to events, and
wherein during (2), the processor of the management apparatus refers to the segment link information and the event index information.

7. The system according to claim 5, wherein the reference history includes at least one of:
(i) a latest reference time which is the time the rule segment was last referred to,
(ii) an average read interval which is an average time interval over which the rule segment is read to the memory, and
(iii) a status of the corresponding rule segment.

8. A system according to claim 5, wherein the management apparatus stores the deleted rule segment in a storage outside of the working memory.

9. A non-transitory computer readable medium having machine instructions stored therein, the instructions when executed by one or more processors, cause the one or more processors to perform operations comprising:
(1) receiving an event notification corresponding to a content of an event transmitted from one information processing device among a plurality of information processing devices, when the event is generated in the one information processing device;
(2) retrieving, from a working memory of a management apparatus, one or more rule segments related to the event notification, and inferring a certain conclusion by referencing the retrieved one or more rule segments, wherein each of the rule segments are divided into entities of rules, each of the rules comprising a combination of condition events to be generated in the information processing devices and a conclusion inferred by the combination of condition events;

(3) updating a corresponding portion of rule segment management information, wherein the rule segment management information includes a reference history for each of the rule segments, (4) selecting a certain one of the rule segments on the working memory which is not readily used, based on the rule segment management information; and (5) deleting the certain rule segment from the working memory.

10. The non-transitory computer readable medium according to claim 9, the instructions further comprising:

creating segment link information which is information relating to links between the rule segments, and event index information for retrieving rule segments relating to events, and during (2), referring to the segment link information and the event index information.

11. The non-transitory computer readable medium according to claim 9, wherein the reference history includes at least one of:

(i) a latest reference time which is the time the rule segment was last referred to, (ii) an average read interval which is an average time interval over which the rule segment is read to the memory, and (iii) a status of the corresponding rule segment.

12. The non-transitory computer readable medium according to claim 9, the instructions further comprising:

storing the deleted rule segment in a storage outside of the working memory.

* * * * *